United States Patent
Kohiga

(10) Patent No.: US 10,171,354 B2
(45) Date of Patent: Jan. 1, 2019

(54) COMMUNICATION PROCESSING SYSTEM, COMMUNICATION PROCESSING APPARATUS, COMMUNICATION PROCESSING METHOD, AND STORAGE MEDIUM

(71) Applicant: NEC Corporation, Minato-ku, Tokyo (JP)

(72) Inventor: Akihito Kohiga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 148 days.

(21) Appl. No.: 15/127,494

(22) PCT Filed: Mar. 11, 2015

(86) PCT No.: PCT/JP2015/001314
§ 371 (c)(1),
(2) Date: Sep. 20, 2016

(87) PCT Pub. No.: WO2015/146027
PCT Pub. Date: Oct. 1, 2015

(65) Prior Publication Data
US 2017/0134271 A1  May 11, 2017

(30) Foreign Application Priority Data
Mar. 28, 2014 (JP) .................. 2014-067518

(51) Int. Cl.
*H04L 12/721* (2013.01)
*H04L 12/64* (2006.01)
*H04L 12/26* (2006.01)

(52) U.S. Cl.
CPC .......... *H04L 45/70* (2013.01); *H04L 12/6418* (2013.01); *H04L 43/0864* (2013.01)

(58) Field of Classification Search
CPC ... H04L 43/0864; H04L 45/70; H04L 12/707; H04L 12/725; H04L 12/803
See application file for complete search history.

(56) References Cited

U.S. PATENT DOCUMENTS 6,973,038 B1 * 12/2005 Narendran ............. G06Q 30/06
370/229
7,855,639 B2 * 12/2010 Patel ........................ A62B 3/00
340/521
(Continued)

FOREIGN PATENT DOCUMENTS

JP  H07-287678 A  10/1995
JP  2001-034581 A  2/2001
(Continued)

OTHER PUBLICATIONS

Yamada Kei et al, "A Total Optimization Method for Network Quality Using Flow Control Considering Service Priority", Technical Report of the Proceeding of the Institute of Electronics, Information and Communication Engineers, Jan. 10, 2013, vol. 112, No. 379, p. 121-126, particularly p. 123-p. 125, "3.3 optimization algorithm".

(Continued)

*Primary Examiner* — Benjamin H Elliott, IV

(57) ABSTRACT

Provided is a communication processing system including a response time measuring unit, a routing unit, and a communication route setting unit. The response time measuring unit measures a response time on a communication route between one or more communication apparatuses. The routing unit controls a communication route between the one or more communication apparatuses, based on the first communication route information to which a communication route between communication apparatuses is set. The communication route setting unit sets, based on the measured response time, a first communication route on which communication data related to a certain communication between communication apparatuses is transferred, to the first communication route information. The communication route setting unit sets, a communication route being different from the first communication route, on which communication (Continued)

data related to a communication other than the certain communication is transferred, to the first communication route information.

8 Claims, 27 Drawing Sheets

(56)  References Cited

U.S. PATENT DOCUMENTS

| | | | |
|---|---|---|---|
| 2003/0133443 A1* | 7/2003 | Klinker | H04L 29/06 370/353 |
| 2012/0020211 A1* | 1/2012 | Narendran | G06Q 30/06 370/231 |
| 2012/0020212 A1* | 1/2012 | Narendran | G06Q 30/06 370/231 |
| 2013/0114598 A1 | 5/2013 | Schrum et al. | |
| 2017/0134271 A1* | 5/2017 | Kohiga | H04L 45/70 |

FOREIGN PATENT DOCUMENTS

| | | |
|---|---|---|
| JP | 2005-109536 A | 4/2005 |
| JP | 2008-098720 A | 4/2008 |
| JP | 2010-239473 A | 10/2010 |
| JP | 2013-175912 A | 9/2013 |

OTHER PUBLICATIONS

International Search Report for PCT Application No. PCT/JP2015/001314, dated Jun. 2, 2015.
English translation of Written opinion for PCT Application No. PCT/JP2015/001314.

* cited by examiner

Fig. 9

FIRST COMMUNICATION ROUTE INFORMATION 801e

| INPUT PORT 901a | VLAN TAG 901b | DESTINATION NETWORK ADDRESS 901c | GATEWAY 901d | NET MASK 901e | OUTPUT PORT 901e |
|---|---|---|---|---|---|
| S0 | 100 | 192.168.1.2 | * | 255.255.255.0 | S3 |
| S0 | 100 | 192.168.1.3 | * | 255.255.255.0 | S6 |
| S1 | 200 | 192.168.2.0 | 192.168.2.254 | 255.255.0.0 | S8 |
| S2 | 300 | 192.168.3.0 | 192.168.3.254 | 255.255.0.0 | S9 |
| S3 | * | 192.168.1.0 | * | 255.255.255.0 | * |
| S6 | * | 192.168.1.0 | * | 255.255.255.0 | * |
| ... | ... | ... | ... | ... | ... |

FIRST COMMUNICATION ROUTE INFORMATION 901

| INPUT PORT 901a | VLAN TAG 901b | DESTINATION NETWORK ADDRESS 901c | GATEWAY 901d | NET MASK 901e | OUTPUT PORT 901e |
|---|---|---|---|---|---|
| S0 | 100 | 192.168.1.2 | * | 255.255.255.0 | S3 |
| S1 | 100 | 192.168.1.3 | * | 255.255.255.0 | S6 |
| S2 | 200 | 192.168.2.0 | 192.168.2.254 | 255.255.0.0 | S8 |
| S2 | 300 | 192.168.3.0 | 192.168.3.254 | 255.255.0.0 | S9 |
| S3 | * | 192.168.1.0 | * | 255.255.255.0 | * |
| S6 | * | 192.168.1.0 | * | 255.255.255.0 | * |
| ... | ... | ... | ... | ... | ... |

801e

COMMUNICATION PROCESSING SYSTEM, COMMUNICATION PROCESSING APPARATUS, COMMUNICATION PROCESSING METHOD, AND STORAGE MEDIUM

This application is a National Stage Entry of PCT/JP2015/001314 filed on Mar. 11, 2015, which claims priority from Japanese Patent Application 2014-067518 filed on Mar. 28, 2014, the contents of all of which are incorporated herein by reference, in their entirety.

TECHNICAL FIELD

The present invention relates to a communication processing system and the like that can reduce the effect of delay generated in the communication network to which a plurality of communication apparatuses are connected.

BACKGROUND ART

In recent years, network systems are widely used in which a plurality of information processing apparatuses and the like are connected to be mutually communicable via the communication networks such as the Internet (hereinafter simply referred to as "network").

In such a network system, various types of data are transmitted and received between pluralities of information processing apparatuses. For this reason, processing load related to data communication may concentrate on such an information processing apparatus as a server providing a certain service. In addition, there may be cases in which communication data concentrates on a certain communication route on a network, and causes a delay on the communication route. In such cases, the communication qualities such as the communication responsiveness and real-time characteristics may be degraded.

So as to prevent degradation of communication qualities caused by the above-mentioned concentration of communication data, such countermeasures as selecting one of a plurality of communication routes which has not caused any delay, or multiplexing a certain communication route, can be considered.

The following patent literatures are examples of related technologies with regard to such communication quality problems.

PTL 1 discloses a technology related to a communication route selecting system and the like in which a transmitter of a communication packet can dynamically select a transfer route of the communication packet.

The technology disclosed in PTL 1 registers a plurality of communication routes to a same communication destination, on a routing table, and measures a packet round-trip time for each communication route. The technology disclosed in PTL 1 realizes load balancing to the network by selecting a communication route based on the measured round-trip time. In other words, the technology disclosed in PTL 1 can prevent concentration of load to a certain communication route by selecting a route on which the response time is short.

PTL 2 discloses a technology related to a packet transmitting system and the like that connects the packet transmitting and receiving apparatuses using a plurality of communication routes and transmits and receives a multiplexed packet via a plurality of communication routes.

The technology disclosed in PTL 2 divides data to be transmitted into packets of a certain length, assigns serial packet numbers to the packets, and copies each packet and transmits the copied packets in parallel from a plurality of communication routes. The technology disclosed in PTL 2 rearranges the packets so that only one copy of the same packet included in each copied transmission packet sequence exists on the same communication route, and that copies of the same packet are not transmitted concurrently from any communication route.

The technology disclosed in PTL 2 enables multiplexing of communication routes, as well as ensuring reliability of the communication routes by recovering the communication error in packet transfer.

CITATION LIST

Patent Literature

[PTL1]: Japanese Patent Application Publication No. 2010-239473

[PTL2]: Japanese Patent Application Publication 2001-034581

SUMMARY OF INVENTION

Technical Problem

In the above-described network system, when a transmitting apparatus and a receiving apparatus are connected via a network device such as a router and a switch, for example, the arrival interval of the communication data to the receiving apparatus may be disturbed.

Specifically, when another communication device connected to the above-mentioned network device transmits or receives communication data, a delay may be caused on the network due to the communication data. There is also a possibility that communication data between the above-mentioned transmitting apparatus and the receiving apparatus may stay on the network device, because of the transmission or reception of communication data concerning the other communication device.

In such a case, a time required for reconstructing the original data from the communication data received by the receiving apparatus tends to fluctuate, and real-time characteristics of communication would be degraded.

For this reason, the above-explained network system requires a technology to reduce the effect, on the real-time characteristic, of the delay that is caused on the communication routes.

In addition, when communication apparatuses mutually communicate via a plurality of communication routes, the original data are divided into a plurality of pieces of communication data (e.g., packet), and transmitted in parallel via respective communication routes. The communication data transmitted in parallel from the transmitting apparatus will arrive on the receiving apparatus asynchronously. In this case, so as to perform efficiently the process to reconstruct the original data from the received communication data, a technology is required which can process the communication data for each of the plurality of communication routes in parallel, for example.

According to the technology disclosed in the above-explained PTL 1, a communication route of which delay is relatively low can be selected based on the packet round-trip time. However, if a delay is already caused on a selectable communication route, it is difficult to avoid such a delay completely, therefore, the real-time characteristics of communication could be degraded.

The technology disclosed in PTL 2 can ensure reliability of the communication route by recovering communication errors in packet transfer. However if there is a delay caused in each communication route, it will take time to reconstruct packets, which would degrade real-time characteristics of communication. In addition, it is required, with the technology disclosed in PTL 2, to collect all the packets constituting the original data, so as to reconstruct (recover) the original data from the packets arrived from the plurality of routes. Such communication packets have to be exclusively collected to pursue reconstructing. Therefore, it is difficult to conduct the process in parallel, by the technology disclosed in PTL 2.

The present invention has been conceived in light of the above-described circumstances. A main objective of the present invention is providing a communication processing system and the like which can separate a communication route used for a certain communication, from communication routes used for other communications, when a delay has occurred in at least a part of the communication routes among the plurality of communication routes in a network.

Solution to Problem

To achieve the objective, a communication processing system according to one aspect of the present invention is configured to include: a response time measuring means that measures a response time on a communication route between a first communication apparatus and a second communication apparatus communicably connected with the first communication apparatus; a routing means including a first communication route information storage means and a communication route controlling means, the first communication route information storage means storing first communication route information to which a communication route between one or more communication apparatuses including the first communication apparatus and the second communication apparatus is set, and the communication route controlling means controlling a route on which communication data is transmitted and received between the one or more communication apparatuses, based on the first communication route information; and a communication route setting means that, based on the measured response time, one or more first communication routes on which communication data related to a certain communication between the first communication apparatus and the second communication apparatus is transmitted and received, to the first communication route information, and sets a communication route, being different from the first communication route, on which communication data related to a communication other than the certain communication is transmitted and received, to the first communication route information.

A communication processing apparatus according to one aspect of the present invention is configured to include: a routing means including a first communication route information storage means and a communication route controlling means, the first communication route information storage means storing first communication route information to which a communication route between one or more communication apparatuses including the first communication apparatus and a second communication apparatus communicably connected with the first communication apparatus is set, and the communication route controlling means controlling a route on which communication data is transmitted and received between the one or more communication apparatuses based on the first communication route information; and a communication route setting means that, based on a response time measured on a communication route between the first communication apparatus and the second communication apparatus, sets one or more first communication routes on which communication data related to a certain communication between the first communication apparatus and the second communication apparatus is transmitted and received, to the first communication route information, and sets a communication route, being different from the first communication route, on which communication data related to a communication other than the certain communication is transmitted and received to the first communication route information.

A communication processing method according to one aspect of the present invention is configured to include: measuring a response time on a communication route between a first communication apparatus and a second communication apparatus connected to be communicable with the first communication apparatus; and based on the measured response time, setting one or more first communication routes on which communication data related to a certain communication between the first communication apparatus and the second communication apparatus is transmitted and received, and setting a communication route different from the first communication route on which communication data related to a communication other than the certain communication is transmitted and received.

The above objective is also achieved by a computer program realizing, by means of a computer, a communication processing system and a communication processing apparatus having the above-described structures and a corresponding communication processing method, and a computer-readable storage medium on which such a computer program is stored (recorded).

Advantageous Effects of Invention

According to the present invention, a network can be constructed which can separate a communication route used for a certain communication, from communication routes used for other communications, when a delay has occurred in at least a part of communication route among the plurality of communication routes in the network. Consequently, the present invention can construct communication routes not susceptible to delays occurring on a part of the communication routes.

BRIEF DESCRIPTION OF DRAWINGS

FIG. 9 is a diagram illustrating first communication route information before the communication routes are changed, according to the second exemplary embodiment of the present invention.

FIG. 19 is a diagram illustrating the first communication route information after the communication routes are changed, according to the second exemplary embodiment of the present invention.

DESCRIPTION OF EMBODIMENTS

The following describes in detail the exemplary embodiments of the present invention with reference to the drawings. The configurations described in the following exemplary embodiments are merely illustrative, and do not limit the technical scope of the present invention.

<First Exemplary Embodiment>

Figure 1:
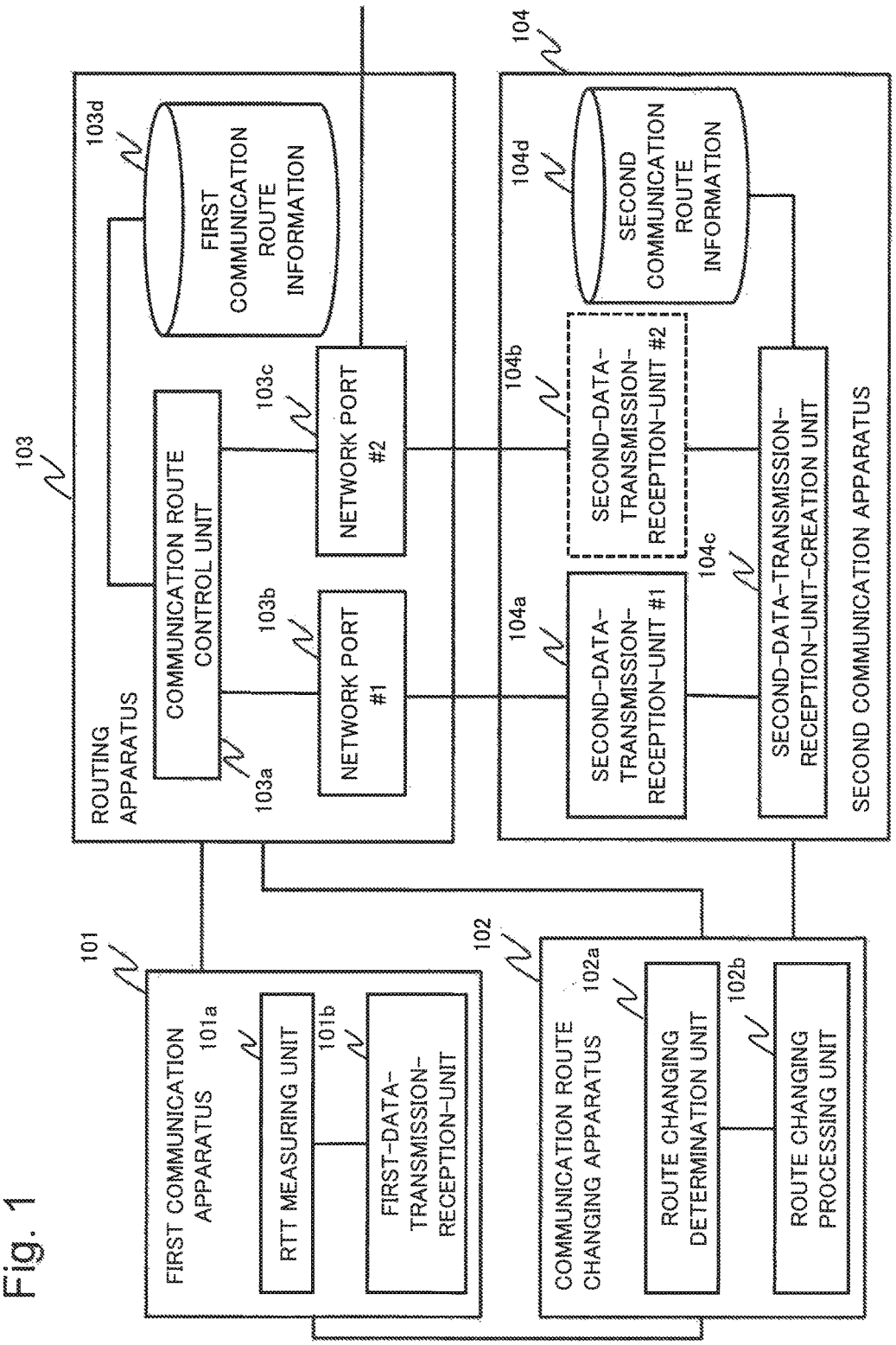
FIG. 1 is a block diagram illustrating a functional configuration of a communication processing system according to a first exemplary embodiment of the present invention.

As illustrated in FIG. 1, the communication processing system according to a first exemplary embodiment of the present invention includes a first communication apparatus 101, a second communication apparatus 104, a communication route changing apparatus 102 and a routing apparatus 103. Hereinafter, these components may be simply referred to as "components of the communication processing system."

In the present exemplary embodiment, the components of the communication processing system mentioned above are communicatively connected to each other by any network. Such a network may be a wide area communication network such as the Internet. Such a network may also be an internal communication network such as LAN (Local Area Network) represented by Ethernet (registered trademark). Such a network may be connected to a plurality of other communication apparatuses not illustrated. Such other communication apparatuses can transmit and receive various types of communication data to and from the components of the communication processing system mentioned above.

In the present exemplary embodiment, any appropriate communication protocol may be adopted as a communication protocol on the above-mentioned network. Such a communication protocol may be TCP/IP (Transmission Control Protocol/Internet Protocol), UDP (User Datagram Protocol)/IP, and the like.

In the present exemplary embodiment, each component of the communication processing system mentioned above may be configured by certain hardware realizing the function of each component. Each component of the communication processing system mentioned above may also be configured by a general-purpose information processing apparatus such as a computer and a software program (computer program) executed on the information processing apparatus, for example.

For example, the first communication apparatus 101 according to the present exemplary embodiment functions as a transmitting apparatus transmitting communication data, to the second communication apparatus 104 (which is described later). The first communication apparatus may transmit and receive communication data to and from any other communication apparatus connected to a network.

The first communication apparatus 101 according to the present exemplary embodiment includes an RTT measuring unit 101a and a first-data-transmission-reception-unit 101b.

The RTT measuring unit 101a measures a round trip time (RTT) on the above-mentioned network. The RTT is a time spent since the first communication apparatus 101 transmits communication data to the second communication apparatus 104 and until the response result is returned. The communication data may be transmitted by being divided into packets (e.g., IP packet).

The RTT measuring unit 101a may notify the communication route changing apparatus 102 (which is described later) of the value of the measured RTT.

The first-data-transmission-reception-unit 101b transmits and receives communication data between the first communication apparatus 101 and various types of communication apparatuses, the routing apparatus, and the like connected to the network. More specifically, the first-data-transmission-reception-unit 101b may receive communication data transmitted from the routing apparatus 103 (which is described later), and transmit communication data being transmitted from the first communication apparatus 101, to the routing apparatus 103. The first-data-transmission-reception-unit 101b may implement a function to transmit transmission data by dividing the transmission data into packets, and reconstruct the original data from the received packets, for example. The first-data-transmission-reception-unit may be a software program executing various types of communication processes using network communication hardware not illustrated.

The communication route changing apparatus 102 according to the present exemplary embodiment changes a communication route between each communication apparatus connected to a network based on the value of RTT notified by the above-described RTT measuring unit 101a. The communication route changing apparatus 102 according to the present exemplary embodiment includes a route changing determination unit 102a and a route changing processing unit 102b.

Based on the RTT measurement result described above, the route changing determination unit 102a instructs the route changing processing unit 102b to separate the communication route between certain communication apparatuses, from the communication route between the other communication apparatuses being different from the certain communication apparatuses. More specifically, the route changing determination unit 102a may instruct the route changing processing unit 102b to change the communication route, when the RTT measurement result exceeds a predetermined threshold value.

The route changing processing unit 102b instructs communication route control unit 103a in the routing apparatus 103 (described later), to change (switch) the communication route. In addition, the route changing processing unit 102b instructs the second communication apparatus 104 (described later) to change the communication route in that second communication apparatus. When necessary, the route changing processing unit 102b may instruct the second second-data-transmission-reception-unit-creation unit 104c in the second communication apparatus 104 to create the second-data-transmission-reception-unit, in the second communication apparatus 104.

In the specific example illustrated in FIG. 1, normally the second-data-transmission-reception-unit #1 (104a) performs various types of communication, for example; and if necessary, the second-data-transmission-reception-unit #2 (104b) may be created (activated) as a new second-data-transmission-reception-unit In the description below, it is assumed that the second-data-transmission-reception-unit #1 (104a) performs various types of communication, in a normal state in which the RTT measurement result does not exceed the predetermined threshold value. In other words, it is assumed that, in the normal state, the second-data-transmission-reception-unit #2 (104b) is not used in the communication. The creation (activation) of the second-data-transmission-reception-unit will be described later.

The routing apparatus 103 is a communication processing apparatus that communicatively connects the communication apparatuses connected to a network, based on the information of the communication routes having been set. Such a communication processing apparatus may be a network router, a network switch, and the like.

The routing apparatus 103 according to the present exemplary embodiment includes a communication route control unit 103a, one or more network ports, and a first communication route information storage 103d storing (keeping) the first communication route information. Such a network port may be a network port #1 (103b) and a network port #2 (103c) illustrated in FIG. 1 and the like. In FIG. 1, two network ports are illustrated, however the routing apparatus 103 according to the present exemplary embodiment is not limited to this, and may include any number of network ports. In the following explanation, the network port #1 (103b) and the network port #2 (103c) illustrated in FIG. 1, and the like may be referred to as "network port."

For example, the routing apparatus 103 according to the present exemplary embodiment receives communication data transmitted from a certain communication apparatus, at a certain communication port (e.g., network port #1 (103b). Then, the routing apparatus 103 transmits that communication data from another communication port (e.g., network port #2 (103c) to another communication apparatus, based on information of the communication route set in the first communication route information (hereinafter simply referred to as "the first communication route information") stored in the first communication route information storage 103d.

The network ports in the routing apparatus 103 receives communication data (packet) from various types of communication apparatuses including the first communication apparatus 101 and the second communication apparatus 104 and are connected to a network. Then, the network port, upon reception of the communication data, transmits the received communication data to the destination communication apparatus, based on the instruction by the communication route control unit 103a.

The communication route control unit 103a in the routing apparatus 103 transmits the communication data received from each of the network ports to the communication apparatus as transmission destination, based on the information of the communication route registered in the first communication route information.

Specifically, the communication route control unit 103a checks the destination information of the network included in the communication data received at the network port. Such destination information may be an address (destination address) of the communication apparatus as the transmission destination (destination) of the communication data on the network, for example.

The communication route control unit 103a determines the network port associated with the destination information, based on the first communication route information. Then, the communication route control unit 103a transmits the received communication data from the network connected to the destination communication apparatus, based on the determination.

The first communication route information storage 103d in the routing apparatus 103 stores information for controlling the communication route on which communication data is transmitted and received, for each network port. The first communication route information may include destination information and the like, with regard to various types of communication apparatuses connected to each network port and other routing apparatuses not illustrated, for example. In the following, with reference to FIG. 2, an example of a specific configuration of the first communication route information according to the present exemplary embodiment will be explained. The specific example illustrated in FIG. 2 is a specific example in a case where an IP network is adopted as the network mentioned above.

Figure 2:
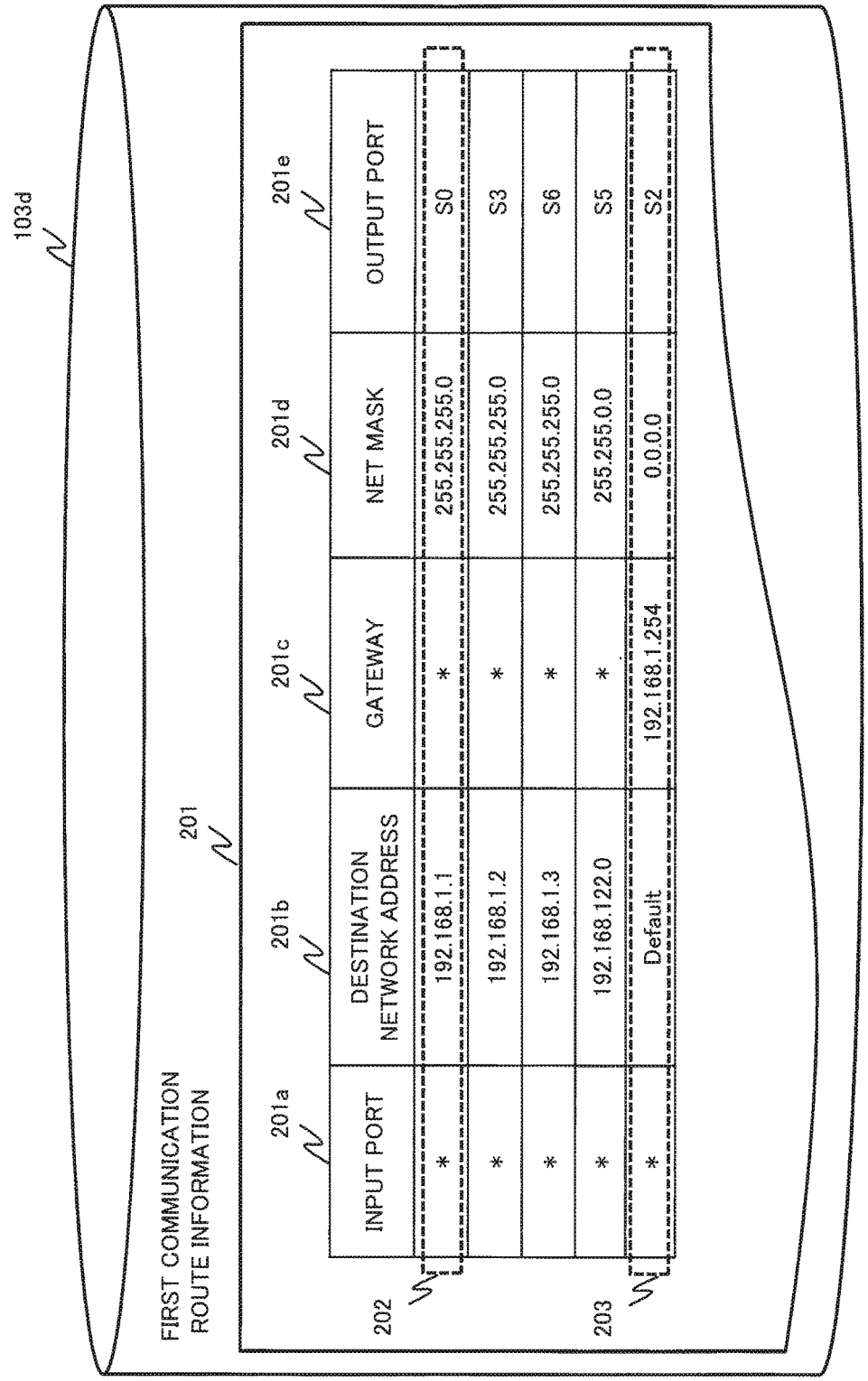
FIG. 2 is a diagram illustrating first communication route information before the communication routes are changed, according to the first exemplary embodiment of the present invention.

As shown in FIG. 2, the first communication route information (201 in FIG. 2) in the present exemplary embodiment includes information regarding the input port (201a), the destination network address (201b), the gateway (201c), the net mask (201d) and the output port (201e). The first communication route information 201 is not limited to as described above, and may include other information regarding the communication route.

The input port 201a is information (e.g., identification number) that can identify the network port having received the communication data.

The destination network address 201b is information representing a network address being the destination included in the communication data.

The gateway 201c is information representing the destination network address regarding the communication transfer apparatus (gateway device) which the communication data pass through before arriving at the network address designated by the above-mentioned network address 201b.

The net mask 201d is information indicating the effective address range of the destination network address 201b. For example, when the destination network address is "192.168.1.1" and the net mask is "255.255.255.0", the portion corresponding to the netmask indicated by "255" is not an effective destination network address. In such a case, of the four numbers sectioned by the dots of the destination network address, only the right-most number is effective in indicating a destination. The effective range of the destination network address represents, in the the IP network for example, the range of the network on which broadcast packets arrive.

The output port 201e is information (e.g., identification number) that can identify the network port that transmits the communication data including the destination set to the destination network address 201b.

In the following, entries of route information represented at the uppermost column (202) and the lowermost column (203) surrounded by broken lines, in the specific example illustrated in FIG. 2, will be explained.

In the uppermost-column entry (202) of the communication route information, A symbol "*" is set to the input port 201a. This indicates that the information regarding the input port (e.g., identification information of the input port in this specific example) is not used for control of the communication route. That is, in this case, selection of a communication route for such communication data is not affected by whichever communication port the communication data has been received.

In the entry 202, "*" is set to the gateway 201c likewise, which indicates that the information set to the gateway 201c does not affect selection of the communication route regarding the communication data.

In the entry 202, the destination network address 201b is assigned with "192.168.1.1", and the output port 201e is assigned with "S0".

In this case, the route represented by the entry 202 indicates that, if communication data includes "192.168.1.1" as destination information, the communication data is to be transmitted from the network port identified by "S0" in the routing apparatus 103.

In the lowermost-column entry (203) of the communication route information, the destination network address 201b is assigned with "Default" and the gateway 201c with "192.168.1.254", and the output port 201e with "S2".

If the destination information included in the communication data is not registered in the first communication route information 201, the "Default" being set to the destination network address 201b is used as the transmission destination of the communication data. Specifically, in the specific example illustrated in FIG. 2, the "Default" is set as the destination network address to the communication data including destination information other than "192.168.1.1", "192.168.1.2", "192.168.1.3", and "192.168.122.0". Since the output port 201e is assigned "S2", this communication data is transmitted from the network port identified by "S2"at the routing apparatus 103.

For example, the second communication apparatus 104 according to the present exemplary embodiment functions as a receiving apparatus receiving communication data transmitted from the first communication apparatus described above. The second communication apparatus 104 may transmit and receive communication data to and from any other communication apparatus connected to a network.

The second communication apparatus 104 according to the present exemplary embodiment includes one or more second-data-transmission-reception-unit (104a, 104b illustrated in FIG. 1), a second-data-transmission-reception-unit-creation unit 104c, and a second communication route information storage 104d storing (keeping) second communication route information.

The second-data-transmission-reception-unit (104a, 104b illustrated in FIG. 1) receives communication data transmitted from the routing apparatus 103, and transmits communication data to be transmitted from the second communication apparatus 104 to the routing apparatus 103. For example, the second-data-transmission-reception-unit may include a function to divide transmission data into packets and transmit the packets, and reconstruct the original data from the received packets. In this case, the second-data-transmission-reception-unit may create the communication data based on the information registered in the second communication route information stored in the second communication route information storage 104d. Hereinafter, the 104a, 104b, and the others illustrated in FIG. 1 may be simply referred to as "second-data-transmission-reception-unit". In addition, the second communication route information stored in the second communication route information storage 104d may be simply referred to as "the second communication route information".

The second-data-transmission-reception-unit may be realized by a software program and the like operated in the second communication apparatus, for example. In this case, the software program constituting the second-data-transmission-reception-unit may use a network interface provided in the second communication apparatus to transmit and receive various types of communication data with the network port in the above-described routing apparatus 103 for example. Such a network interface may be the 407 illustrated in FIG. 4 described later, for example. The second-data-transmission-reception-unit is not limited to as described above, and may be realized by any hardware or a combination of hardware and a software program.

FIG. 1 illustrates two second-data-transmission-reception-units (104a and 104b). However, the present exemplary embodiment is not limited to this. The second communication apparatus may include one or more second-data-transmission-reception-units.

The second-data-transmission-reception-unit-creation unit 104c creates (or activates) the second-data-transmission-reception-unit based on the instruction from the route changing processing unit 102b. In this case, the second-data-transmission-reception-unit-creation unit 104c may create a second-data-transmission-reception-unit that can execute data transmission and reception processes, or may activate the second-data-transmission-reception-unit already created.

For example, when the second-data-transmission-reception-unit is implemented by a software program, the second-data-transmission-reception-unit-creation unit 104c may create or activate the second-data-transmission-reception-unit by generating or executing such a software program.

The second-data-transmission-reception-unit-creation unit 104c may also activate the second-data-transmission-reception-unit by controlling the second-data-transmission-reception-unit in a standing-by state so that the second-data-transmission-reception-unit becomes an execution state, for example. Not limited to the above, the second-data-transmission-reception-unit-creation unit 104c may create a new second-data-transmission-reception-unit by an adequate method. In addition, the second-data-transmission-reception-unit-creation unit 104c may activate a second-data-transmission-reception-unit prepared in advance.

The second communication route information storage 104d stores the second communication route information being the information controlling the communication route on which the communication data is transmitted and received, for each of the second-data-transmission-reception-units. Specifically, the second communication route information may include information of the routing apparatus, the communication apparatus to be connected, and the like, for each of the second-data-transmission-reception-units. In the following, an example of the specific configuration of the second communication route information according to the present exemplary embodiment will be described, with reference to FIG. 3.

Figure 3:
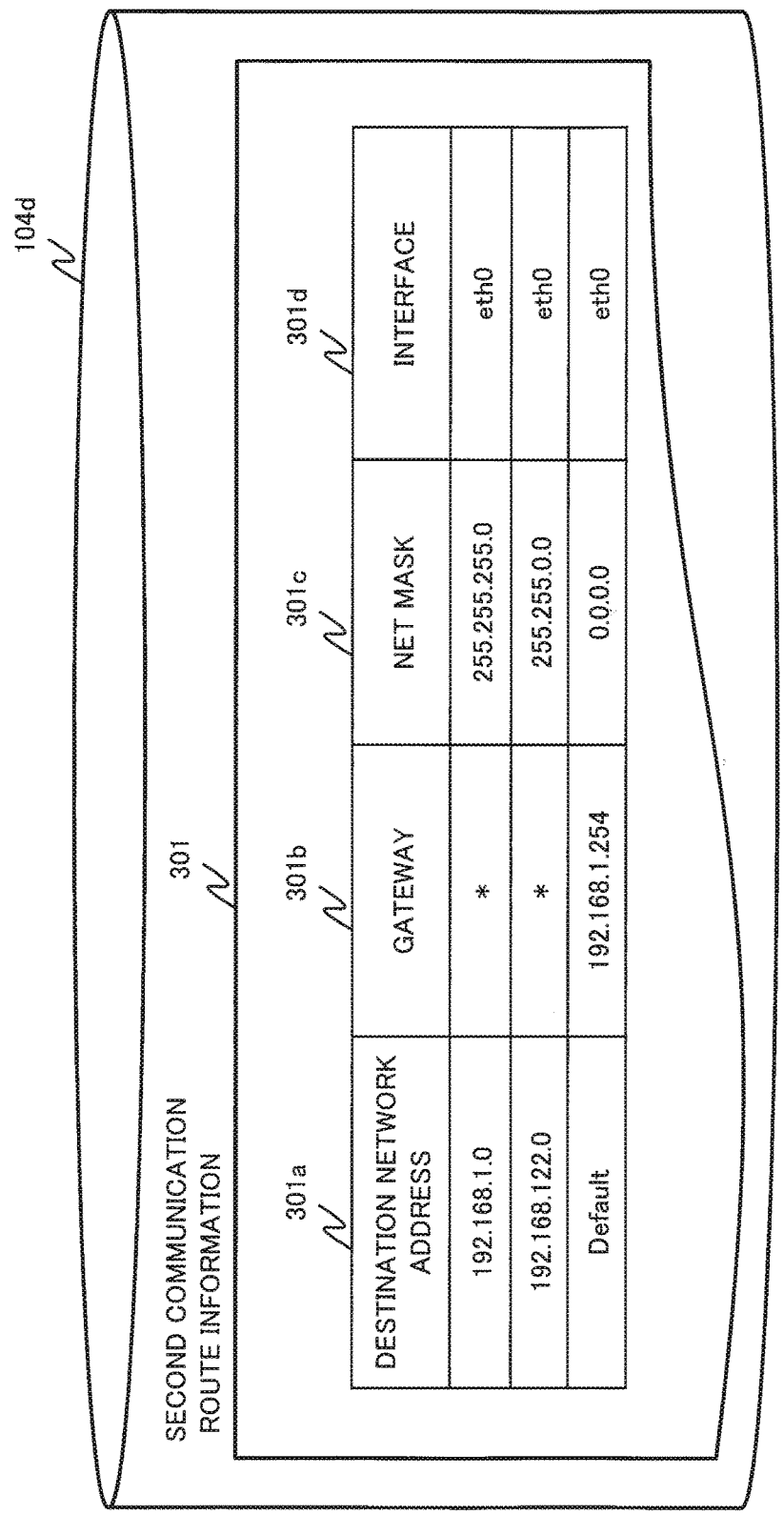
FIG. 3 is a diagram illustrating second communication route information before the communication routes are changed, according to the first exemplary embodiment of the present invention.

As illustrated in FIG. 3, the second communication route information 301 according to the present exemplary embodiment includes information related to the destination network address (301a), the gateway (301b), the netmask (301c), and the interface (301d). Note that the second communication route information 301 may include other information regarding the communication route, not limited to the above.

Here, the destination network address (301a) may be equivalent to the destination network address (201b) in the first communication route information 201 described above. The gateway (301b) may be equivalent to the gateway (201c) in the first communication route information 201 described above. The netmask (301c) may be equivalent to the netmask (201d) in the first communication route information 201 described above. The detailed explanation regarding these are omitted here.

The interface 301d is identification information that can identify the network interface transmitting the communication data including the destination set to the destination network address 301a. Such a network interface is associated with the above-described data transmitting and receiving unit and is used for transmission and reception of various types of communication data.

As described above, although the first communication route information includes the information related to the input port 201a as illustrated in FIG. 2, the second communication route information may not to include the information related to the input port.

Normally, each component described above may use the network port #1 (103b) and the second-data-transmission-reception-unit #1 (104a), to transmit and receive various types of data among the first communication apparatus 101, the routing apparatus 103 and the second communication apparatus 104, for example.

For example, if the RTT measured by the RTT measuring unit 101a exceeds the predetermined threshold value, the second-data-transmission-reception-unit #2 (104b) is created in the second communication apparatus 104.

Then, the setting of the communication route between the first communication route information in the routing apparatus 103 and the second communication route information in the second communication apparatus 104 is changed. Accordingly, for example, in the second communication apparatus 104, communication routes of the communication data to be transmitted and received are separated between the second-data-transmission-reception-unit #1 (104a) and the second-data-transmission-reception-unit #2 (104b). More specifically, the communication routes are separated by separating the destination addresses being set to the second-data-transmission-reception-unit #1 (104a) and being set to the second-data-transmission-reception-unit #2 (104b), in the second communication apparatus 104.

Consequently, according to the communication processing system according to the present exemplary embodiment, the second-data-transmission-reception-unit #2 (104b) may be used for communication for a certain destination and the second-data-transmission-reception-unit #1 (104a) may be used for communication for another destination, for example, which enables different units to be used for communication with different destinations. Accordingly, the effect, being caused by a delay on the certain communication route, on other communication routes may be reduced, and the possibility of degradation of the real-time characteristics of the network may be reduced, for example.

A specific operation of the communication processing system according to the present exemplary embodiment configured as above is explained with reference to FIG. 4 through FIG. 7.

Figure 4:
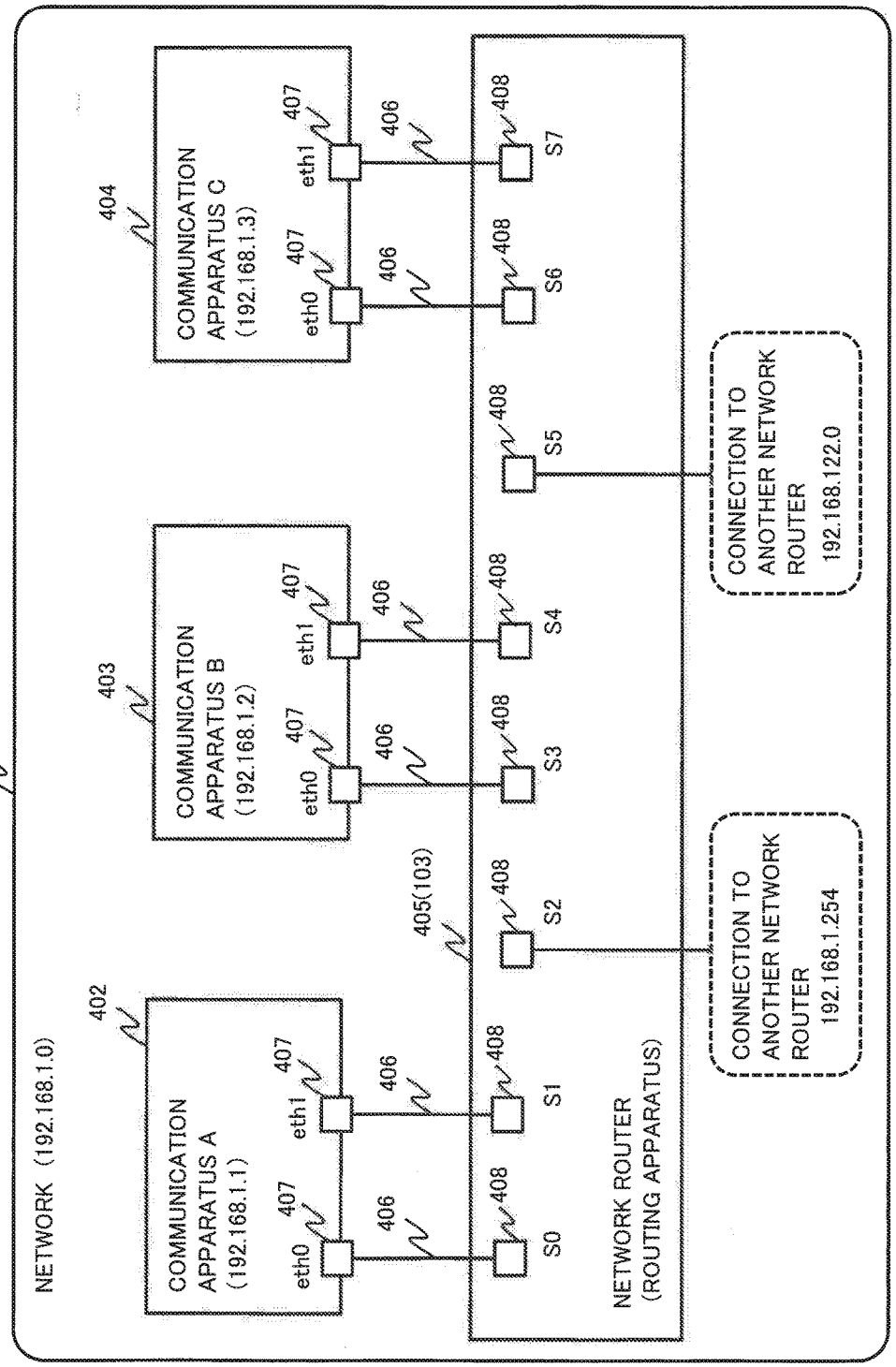
FIG. 4 is a diagram illustrating a specific example of network lines according to the first exemplary embodiment of the present invention.

First, FIG. 4 is a diagram illustrating a specific example of network lines that can realize communication processing system according to the present exemplary embodiment.

The network router 405 includes the network ports "S0" through "S7" (408). The communication apparatus "A" (402), the communication apparatus "B" (403), and the communication apparatus "C" (404) are communicably connected via the network router 405 and the network cable 406. Note that in the present exemplary embodiment, the network router 405 corresponds to the routing apparatus 103 illustrated in FIG. 2, and has configurations and functions equivalent to those of the routing apparatus 103.

Each communication apparatus (communication apparatus "A" through communication apparatus "C") includes the network interfaces "eth0" (407) and "eth1" (407). Note that all these network interfaces 407 may be realized by the same type of interface apparatuses or different type of interface apparatuses.

The network interface 407 is, for example, hardware that can execute communication processing realized by a network card, and the like. The network interface 407 is communicably connected with each network port ("S0" through "S7") in the network router 405 via the network cable 406.

In the specific example illustrated in FIG. 4, the communication apparatus "A" (402) corresponds to the first communication apparatus 101 illustrated in FIG. 1.

The communication apparatus "A" (402) includes two network interfaces "eth0" and "eth1", connected to the network ports "S0" and "S1" in the network router 405. In addition, the communication apparatus "A" (402) is assigned with a destination network address "192.168.1.1".

The first-data-transmission-reception-unit 101b illustrated in FIG. 1 may be configured by the network interface 407 in the communication apparatus "A" (402) and a program (software program) transmitting communication data using the network interface 407.

The first communication route information in the network router 405 illustrated in the network lines diagram illustrated in FIG. 4 corresponds to the first communication route information stored (kept) in the first communication route information storage 103d. In the following explanation, in normal cases (when the change of communication route based on the RTT measurement result (described later) has not been executed), it is assumed that the information illustrated in FIG. 2 is assigned to first communication route information.

The communication apparatus "B" (403) illustrated in FIG. 4 corresponds to the second communication apparatus 104 illustrated in FIG. 2. The communication apparatus "B" (403) is assigned with a destination network "192.168.1.2". In the following explanation, in normal cases, it is assumed that, the information illustrated in FIG. 3 is assigned to the second communication route information in the communication apparatus "B".

The communication apparatus "C" (404) illustrated in FIG. 4 is a communication apparatus communicably connected with the communication apparatus "A" (402) and the communication apparatus "B" (403). The communication apparatus "C" (404) is assigned with a destination network "192.168.1.3".

Note that in the following explanation, for example, it is assumed that the communication data transmitted and received between the communication apparatus "C" (404) and the communication apparatus "A" (402) or the communication apparatus "B" (403) affect the communication between the communication apparatus "A" (402) and the communication apparatus "B" (403).

In normal cases, the communication apparatus "A" (402) corresponding to the first communication apparatus 101 communicates with other communication apparatuses and the like, according to the setting of the first communication route information 201 illustrated in FIG. 2, and using the network connected to the network port "S0". Such other communication apparatuses include the communication apparatus "B" (403) corresponding to the second communication apparatus 104.

Also, in normal cases, the communication apparatus "B" (403) corresponding to the second communication apparatus 104 uses the network connected to the network port "S3" to communicate with other communication apparatuses and the like. Such other communication apparatuses include the communication apparatus "A" (402) corresponding to the first communication apparatus 101.

In the following, the process to separate the communication route between the communication apparatus "B" (403) and the communication apparatus "A" (402) from communication routes for other communication apparatuses, when the RTT measurement result in the RTT measuring unit 101a exceeds the predetermined threshold value, will be described. As already described, the communication apparatus "B" is the second communication apparatus 104, and the communication apparatus "A" is the first communication apparatus 101. In addition, the other communication apparatuses may be the communication apparatus "C" (404), for example.

Figure 5:
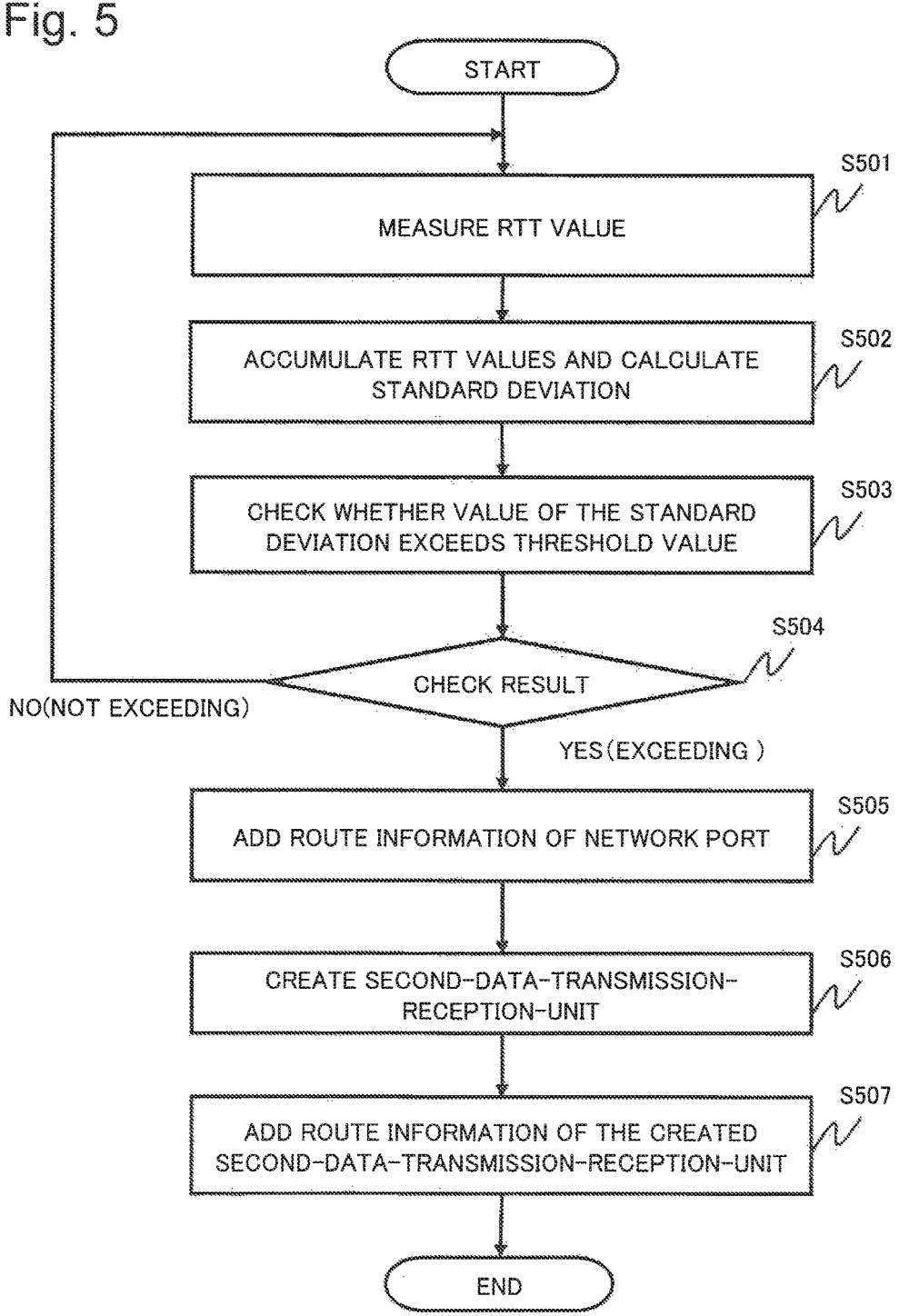
FIG. 5 is a flowchart illustrating a changing process of a communication route according to the first exemplary embodiment of the present invention.

FIG. 5 is a flowchart illustrating a process to separate communication routes according to the present exemplary embodiment.

First, the RTT measuring unit 101a in the first communication apparatus 101 measures the RTT value in the network connected to the first communication apparatus 101 (Step S501). In the specific example illustrated in FIG. 4, the communication apparatus "A" (402), being the first communication apparatus 101, may execute Step S501. The RTT measuring unit 101a may notify the route changing determination unit 102a in the communication route changing apparatus 102 (not illustrated in FIG. 4), of that RTT measurement result.

Next, the route changing determination unit 102a, having received such a notification, calculates the standard deviation by accumulating the RTT values measured in Step S501 (Step S502).

In the flowchart illustrated in FIG. 5, the route changing determination unit 102a calculates the standard deviation of the RTT values. Not limited to this, the route changing determination unit 102a may check each RTT value to see whether it exceeds the threshold value. The route changing determination unit 102a may calculate the moving average of the RTT values, for example. Not limited to as described above, in the present exemplary embodiment, the route changing determination unit 102a may adopt any method which enables to find that the RTT value has become large and the real-time characteristics have been degraded.

Next, the route changing determination unit 102a checks whether the value of the standard deviation calculated in Step S502 exceeds the predetermined threshold value (Step S503). The route changing determination unit 102a may notify the route changing processing unit 102b of the check result.

As a result of the check in Step S503, when the standard deviation of the RTT value does not exceed the predetermined threshold value (No in Step S504), the RTT measuring unit 101a proceeds with the process from Step S501.

When the standard deviation of the RTT value exceeds the predetermined threshold value (Yes in Step S504), the route changing processing unit 102b adds the route information with regard to the network port #2 (103c), to the first communication route information in the network router 405 (corresponding to routing apparatus 103) (Step S505). In this case, the route changing processing unit 102b may either directly change the first communication route information, or instruct the communication route control unit 103a and the like to change the communication route information.

Four pieces of information, as exemplified in the following (1) through (4) are added or changed in Step S505.

(1) The communication data having arrived at the network port "S1" and having a destination network address "192.168.1.2" is output to the output port "S3".

(2) Reverse direction of the above-explained (1). In other words, the communication data having arrived at the network port "S3" and having a destination network address "192.168.1.1" is output to the output port "S1".

(3) The communication data having arrived at the network port "S4" and having a destination network address "192.168.1.3" is output to the output port "S6".

(4) Reverse direction of the above-explained (3). In other words, the communication data having arrived at the network port "S6" and having a destination network address "192.168.1.2" is output to the output port "S4".

That is, with reference to the network lines diagram illustrated in FIG. 4, the communication data (packet) transmitted from the network interface "eth1" of the communication apparatus "A" (402; corresponding to the first communication apparatus 101) is delivered to the network interface "eth0" of the communication apparatus "B" (403; corresponding to the second communication apparatus 104).

When the communication apparatus "B" (403; corresponding to the second communication apparatus 104) communicates with another communication apparatus (e.g., communication apparatus "C" (404)), the communication data is transmitted and received between the network interface "eth1" of the communication apparatus "B" (403) and the network interface "eth0" of the communication apparatus "C" (404).

Figure 6:
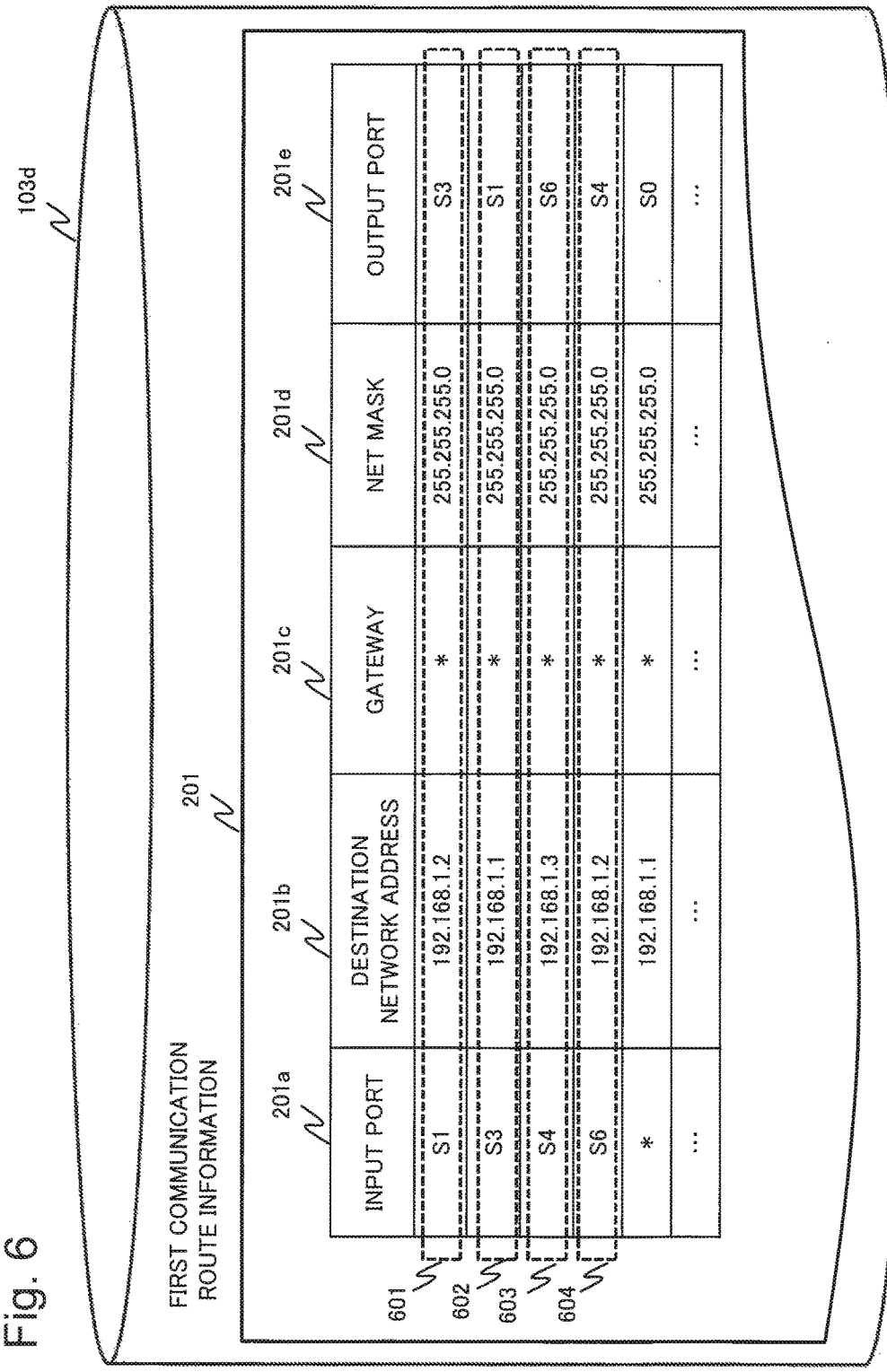
FIG. 6 is a diagram illustrating the first communication route information after the communication routes are changed according to the first exemplary embodiment of the present invention.

FIG. 6 illustrates the first communication route information in the network router 405 (corresponding to the routing apparatus 103) in which the above-explained (1) through (4) are reflected. The entries 601 through 604 illustrated in FIG. 6 are route information corresponding to the above-described (1) through (4) in the stated order.

Next, the route changing processing unit 102b creates the second-data-transmission-reception-unit, in the communication apparatus "B" (403) being the second communication apparatus 104 (Step S506). In this specific example, the route changing processing unit 102b may create the second-data-transmission-reception-unit #2 (104b) illustrated in FIG. 1. More specifically, in this specific example, the route changing processing unit 102b may instruct the second-data-transmission-reception-unit-creation unit 104c in the communication apparatus "B" to create the second-data-transmission-reception-unit #2 (104b).

In this specific example, for example, the second-data-transmission-reception-unit-creation unit 104c in the communication apparatus "B" (403) may execute, based on the instruction from the route changing processing unit 102b, the program which performs various types of communication by use of the network interface "eth1".

Next, the route changing processing unit 102b adds the route information related to the created second-data-transmission-reception-unit #2 (104b), to the second communication route information in the communication apparatus "B" (403) being the second communication apparatus 104 (Step S507).

In this case, the route changing processing unit 102b may either directly change the second communication route information, or instruct the second-data-transmission-reception-unit-creation unit 104c and the like to perform that change.

Figure 7:
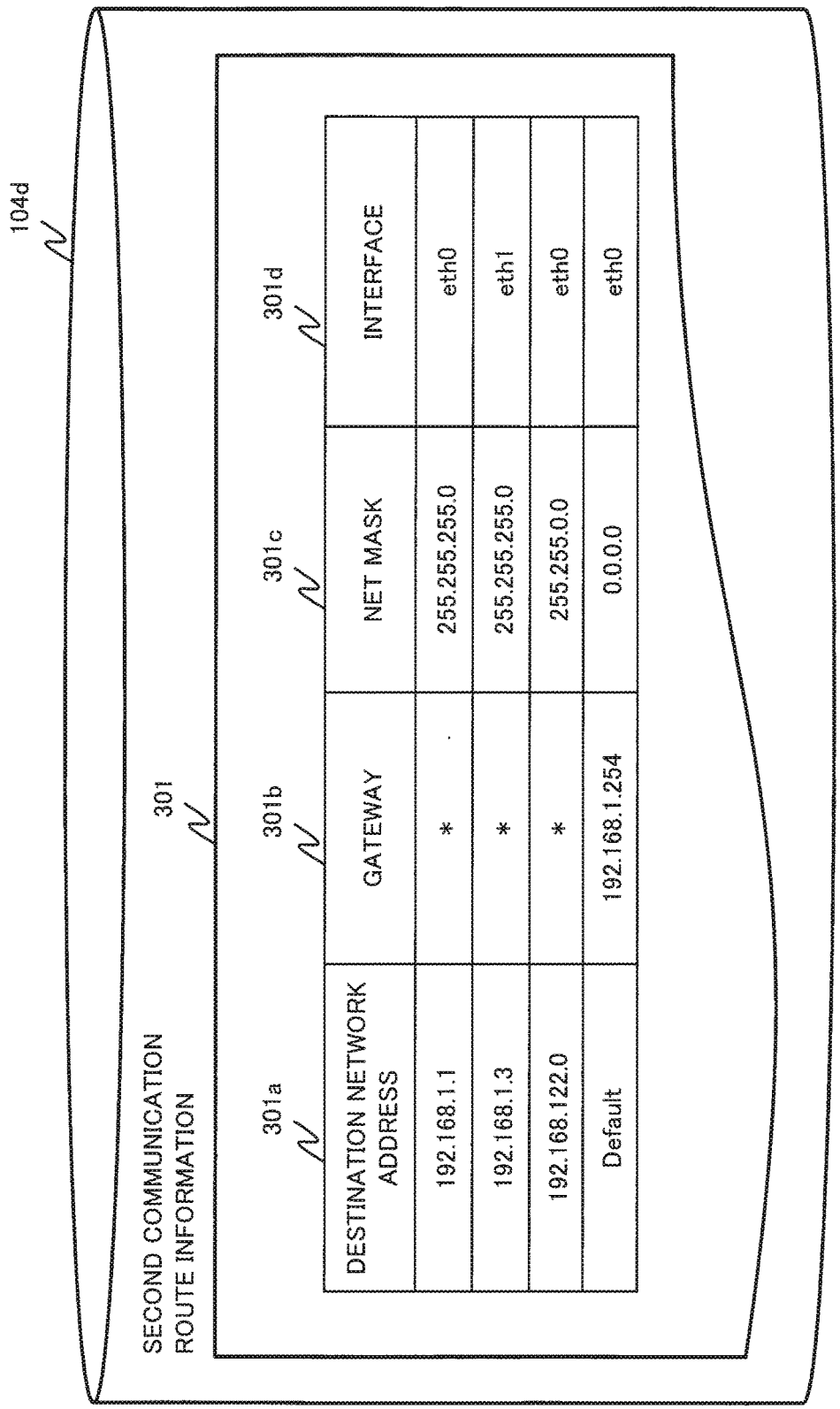
FIG. 7 is a diagram illustrating the second communication route information after the communication routes are changed, according to the first exemplary embodiment of the present invention.

FIG. 7 is a drawing illustrating a specific example of the second communication route information in the communication apparatus "B" (403) changed in Step S507. As illustrated in FIG. 7, the communication data of which the destination is the communication apparatus "A" (corresponding to the first communication apparatus 101) is transmitted form the network interface "eth0" in the communication apparatus "B". Likewise, the communication data whose destination is another communication apparatus (communication apparatus "C" (404)) is transmitted from the network interface "eth1" in the communication apparatus "B".

Based on the above-described first communication route information and the second communication route information, the communication routes are separated as follows.

That is, the communication data transmitted from the communication apparatus "A" (402) to the communication apparatus "B" (403) is input to the network port "S1" in the network router 405. Such communication data is transmitted to the network interface "eth0" in the communication apparatus "B" from the network port "S3". The communication data transmitted from the communication apparatus "B" (403) to the communication apparatus "A" (402) is input to the network port "S3" in the network router 405. Such communication data is transmitted to the network interface "eth1" in the communication apparatus "A" from the network port "S1". The communication data between the communication apparatus "A" (402) and the communication apparatus "B" (403) is transmitted and received along the communication route described above wholly.

On the other hand, the communication data transmitted from communication apparatus "C" (404) being another communication apparatus to the communication apparatus "B" (403) is input to the network port "S6" in the network router 405. Such communication data is transmitted from the network port "S4" to the network interface "eth1" in the communication apparatus "B" (403). The communication data transmitted from the communication apparatus "B" (403) to the communication apparatus "C" (404) is transmitted from the network interface "eth1", and is input to the network port "S4" in the network router 405. Such communication data is transmitted from the network port "S6" to the network interface "eth0" in the communication apparatus "C" (404).

As described above, according to the present exemplary embodiment, with respect to the second communication apparatus 104 (communication apparatus "B"), the communication route for a certain communication apparatus (e.g., the communication apparatus "A" (402)) can be separated from the communication route for other communication apparatuses (e.g., the communication apparatus "C" (404)).

As described above, by the communication processing system according to the present exemplary embodiment, when the measured RTT value exceeds the predetermined threshold value, it is possible to separate the network on which the communication data is transmitted and received, according to the entity (destination) to and from which the communication data is transmitted and received. For this reason, by the communication processing system according to the present exemplary embodiment, it is possible to reduce the possibility of degradation of the real-time characteristics of communication on other communication routes, caused by a delay or the like which is occurred on a certain communication route.

In addition, according to the communication processing system according to the present exemplary embodiment, when communication data is divided into packets, for example, the packets having the same destination will be transferred through the same communication route. Therefore, by providing the above-described data transmitting and receiving unit (101b, 104a, 104b, and the like) on each such communication route, for example, it is unnecessary to exclusively process data having arrived at the network interface on each communication route. Accordingly, the communication processing system in the present exemplary embodiment enables to parallelize easily the transmission and reception process.

According to the communication processing system in the present exemplary embodiment, it becomes possible to provide a communication route not susceptible to a delay caused on a part of the communication routes, and the communication process can be easily parallelized.

<Specific Example Realizing the First Exemplary Embodiment>

As follows, a specific technology that can realize the communication processing system in the above-described first exemplary embodiment is described with reference to FIG. 24 and FIG. 25.

Figure 24:
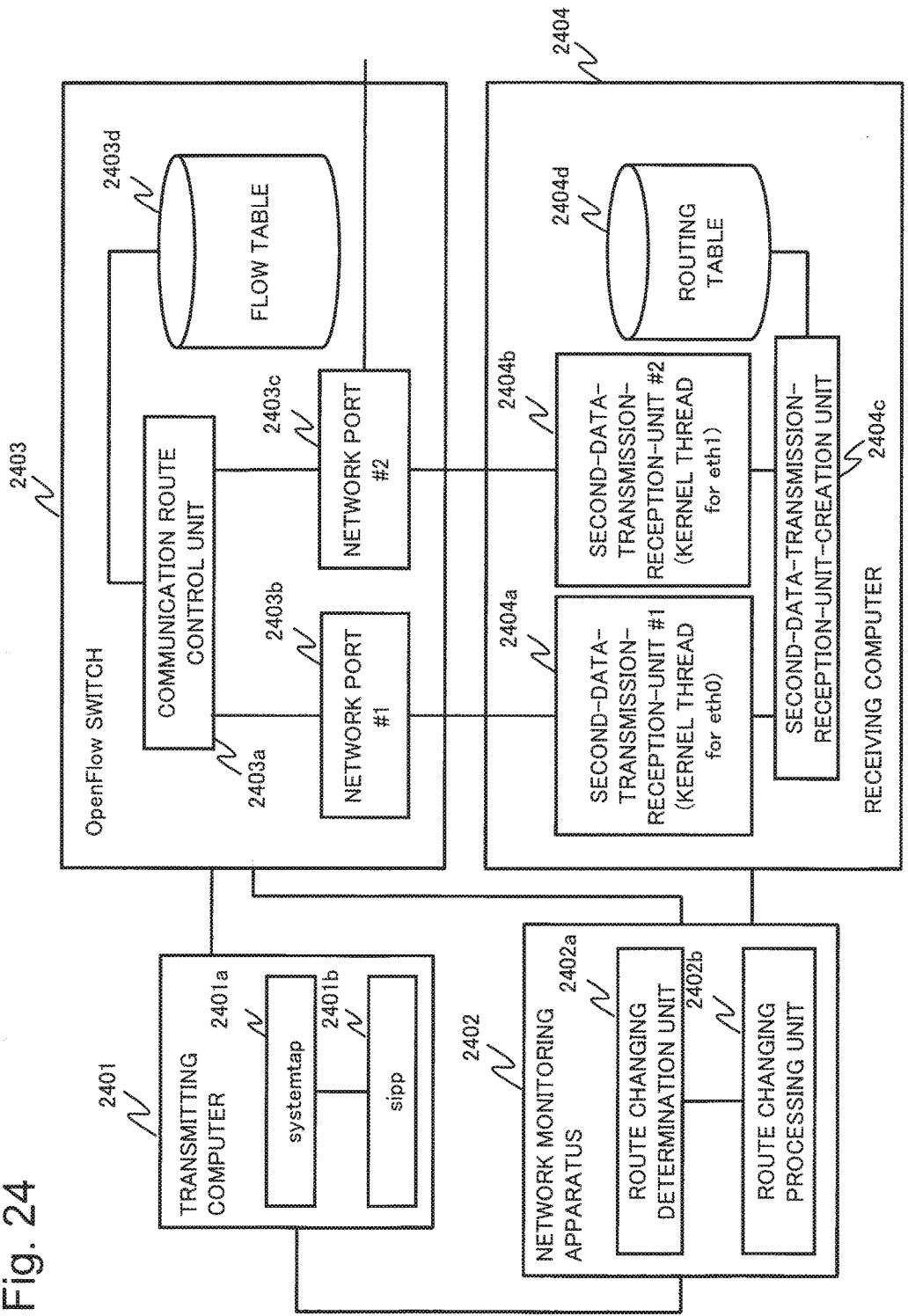
FIG. 24 is a diagram illustrating a functional configuration of a specific example that can realize the communication processing system according to each exemplary embodiment of the present invention.

In the specific example illustrated in FIG. 24, the transmitting computer 2401 corresponds to the first communication apparatus 101 in FIG. 1. Likewise, the network monitoring apparatus 2402 corresponds to the communication route changing apparatus 102. The OpenFlow switch 2403 corresponds to the routing apparatus 103. The receiving computer 2404 corresponds to the second communication apparatus 104.

In this specific example, the SystemTap (2401a) in the transmitting computer 2401 corresponds to the RTT measuring unit 101a and sipp (2401b) corresponds to the first-data-transmission-reception-unit 101b.

The SystemTap (2401a) is a program that can obtain data regarding OS (operating system) and various types of applications executable on the transmitting computer 2401. The SystemTap (2401a) enables calculation of the RTT of the communication data transmitted and received on the later-described sipp (2401b).

The sipp (2401b) may for example be a communication program such as a performance test tool for the SIP (session initiation protocol) server. The SIP is a communication protocol for establishing a session between two or more clients.

The OpenFlow switch 2403 in this specific example is a control apparatus of communication routes, which supports the OpenFlow (registered trademark) being a technology for virtualizing a network. The OpenFlow (registered trademark) is not described in detail because it is a known general technique.

The OpenFlow switch 2403 includes a flow table stored in the flow table storage 2403d, as information corresponding to the first communication route information stored in the first communication route information storage 103d. As follows, the flow table stored in the flow table storage 2403d may be simply referred to as "flow table."

The receiving computer 2404 in this specific example may be an information processing apparatus such as a computer adopting the Linux (registered trademark) for example. In this case, for example, the second-data-transmission-reception-unit #1 (2404a) and the second-data-transmission-reception-unit #2 (2404b) may be a kernel thread executing communication processing in a network interface. More specifically, as the second-data-transmission-reception-unit #1 (2404a), the kernel thread for the network interface "eth0" may be used. Also, as the second-data-transmission-reception-unit #2 (2404b), the kernel thread for the network interface "eth1" may be used.

The receiving computer 2404 includes a routing table stored in the routing table storage 2404d, as information corresponding to the second route information stored in the second communication route information storage 104d. Hereinafter, the routing table stored in the routing table storage 2404d may be simply referred to as "routing table".

In the following, it is assumed that a situation that the transmitting computer 2401 is transmitting an SIP message to the SIP server program (not illustrated) executed by the receiving computer 2404. Under such assumption, in the following, operations of the communication processing system according to the present specific example will be described.

The transmitting computer 2401 uses the SystemTap (2401a) to measure the RTT of the SIP message transmitted and received in the sipp (2401b). The transmitting computer 2401 notifies the route changing determination unit 2402a in the network monitoring apparatus 2402 of the measurement result.

The route changing determination unit 2402a, upon reception of the notification, accumulates the notified RTTs and calculates the standard deviation. The route changing determination unit 2402a has the predetermined threshold value for the standard deviation of the RTT. The route changing determination unit 2402a, when the standard deviation of the RTT exceeds the threshold value, instructs the route changing processing unit 2402b to change the communication route for the OpenFlow switch 2403 and the receiving computer 2404. In this case, the route changing processing unit 2402b may set to use multiple communication routes between certain communication apparatuses, by changing the communication route.

Note that the route changing processing unit 2402b may directly change the flow table stored in the flow table storage 2403d and the routing table stored in the routing table storage 2404d. The route changing processing unit 2402b may instruct the communication route control unit 2403a or the second-data-transmission-reception-unit-creation unit 2404c, and the like, to change the flow table or the routing table.

In the following, such a route changing process will be described with reference to the flowchart illustrated in FIG. 5.

First, the route changing processing unit 2402b adds route information of the network port #2 (2403c), to the flow table (Step S505).

In the following, as a specific example of the route information being set to the flow table, process of adding the route information corresponding to above described (1) "the communication data arriving at the network port 'S1' and having a destination network address of '192.168.1.2' is output to the output port 'S3'" in the above-described first exemplary embodiment is described.

Figure 25:
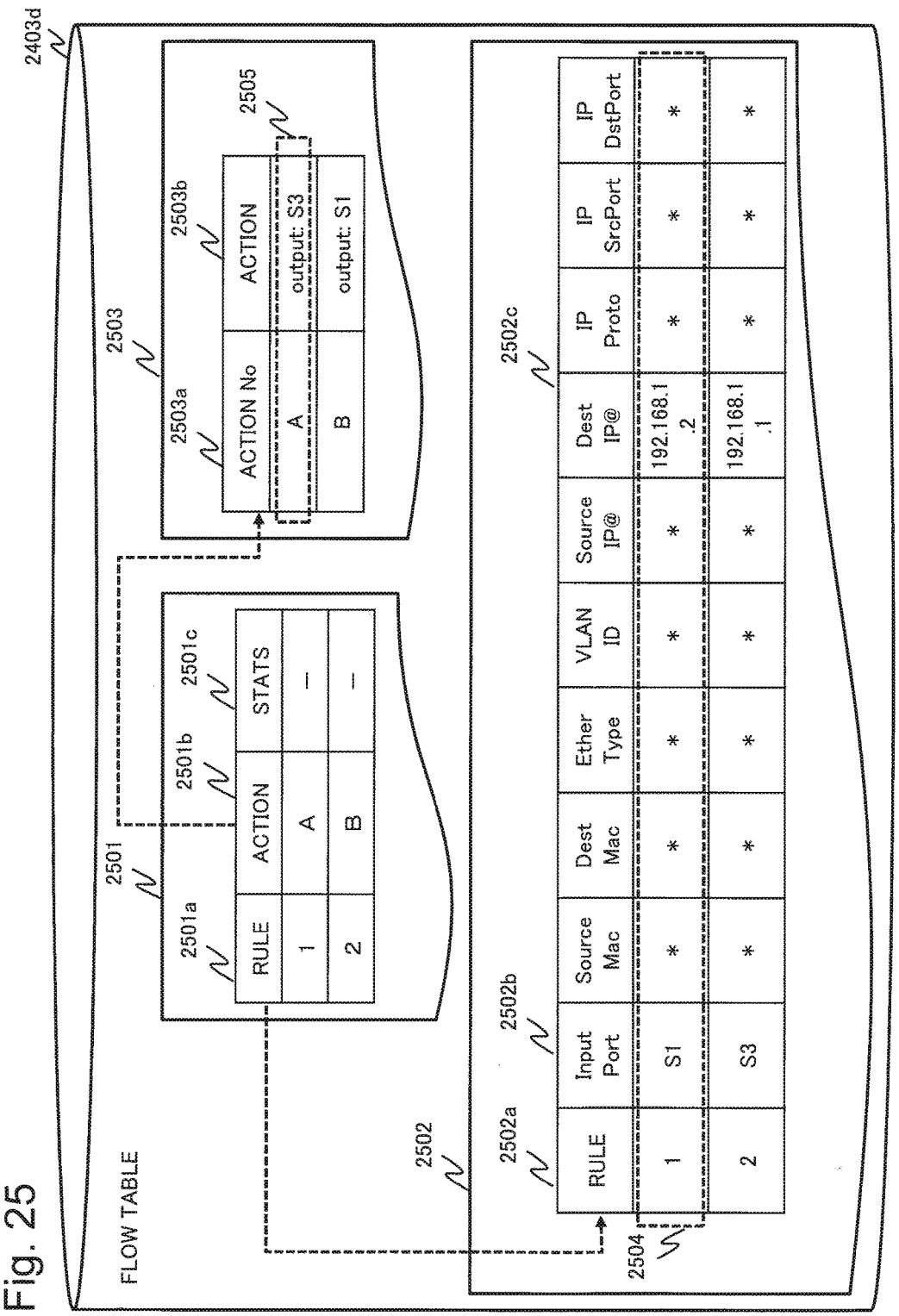
FIG. 25 is a diagram illustrating a specific example of a flow table in a specific example that can realize the communication processing system according to each exemplary embodiment of the present invention.

The flow table in this specific example includes three elements, namely the "RULE" element (2501a), the "ACTION" element (2501b) and "STATS" element (2501c) in the structure such as the 2501 as illustrated in FIG. 25 for example.

The "RULE" element 2501a may include various types of information for controlling the communication route to various types of communication data, in the structure such as the 2502 as illustrated in FIG. 25 for example. The "ACTION" element 2501b may include information with regard to the processes to be executed for controlling the communication route, in the structure such as the 2503 as illustrated in FIG. 25 for example. Such control processes may include designation of the output port and the like in the OpenFlow switch 2403, for example.

The OpenFlow switch 2403 controls the communication route for the communication data, according to the route information described in the flow table. More specifically, the OpenFlow switch 2403 analyzes the communication data, and executes the "ACTION" designated by the "ACTION" element 2501b, for the communication data corresponding to the control rule designated by the "RULE" element 2501a.

Here, the "RULE" (2501a) corresponding to the above (1) corresponds to the "RULE 1" in FIG. 25 (2504 in FIG. 25). In addition, "A" is set to the "RULE 1" as "ACTION" 2501b. That is, by setting of the "RULE 1" (entry 2504), "ACTION A" is executed on the communication data that arrives at "S1" being the input port (InputPort: 2502b) and has a destination network address (DestIP@:2502c) of "192.168.1.2". Referring to the 2503 in FIG. 25, because the "ACTION A" is the "output: S3" (2505 in FIG. 25), that communication data is output to the output port "S3".

As described above, the route changing processing unit 2402b adds, to the flow table, the "RULE" element 2501a, the "ACTION" element 2501b and information included in each element.

Next, the route changing processing unit 2402b instructs to create the second-data-transmission-reception-unit #2 (2404b) in the receiving computer 2404 (Step S506).

Specifically, the route changing processing unit 2402b may instruct to create a kernel thread (kernel thread for "eth1") processing the communication data (packet) transmitted and received in the second-data-transmission-reception-unit #2 (2404b). Then, the route changing processing unit 2402b may instruct to start initialization of the network interface eth1 and reception of communication data. Note that the route changing processing unit 2402b may instruct the receiving computer 2404 to perform processing to create the second-data-transmission-reception-unit #2 (2404b), and the receiving computer 2404 may execute the creation processing.

Next, the route changing processing unit 2402b instructs to update the routing table in the receiving computer 2404, and add the route information regarding the created second-data-transmission-reception-unit #2 (2404b) (Step S507). This addition of the route information may be similar to the process explained in the above-described first exemplary embodiment, and therefore the detailed explanation is omitted.

As described above, by the configuration illustrated in this specific example, the communication processing system according to the above-described first exemplary embodiment can be realized.

As described above, the communication processing system in this specific example can separate the network according to the transmission and reception destination, when the measured RTT value exceeds the predetermined threshold value. Consequently, the communication processing system according to the present exemplary embodiment can reduce the possibility of degradation of the real-time characteristics of communication on the other communication routes being caused by delay and the like occurring on a certain communication route.

Note that, according to the above-described specific example, each exemplary embodiment according to the present invention described below can also be realized.

<The Second Exemplary Embodiment>

Next, the second exemplary embodiment according to the present invention is described. The following explanation mainly explains the characteristic portion of the present exemplary embodiment, and omits the explanation overlapping with the configuration similar to that of the above-described first exemplary embodiment.

As described later, the communication processing system according to the present exemplary embodiment is different from the above-described first exemplary embodiment, in that it aggregates the communication routes between each communication apparatus, in a virtual network environment. In the following, this difference will be mainly described. In the following explanation, a specific example in which VLAN (virtual local area network) is adopted as the virtual network is explained, however the present exemplary embodiment is not limited to this.

In the following, a method of aggregating the communication route set to the second-data-transmission-reception-unit #3 (802c in FIG. 8) and the VLAN interface #3 (802f in FIG. 8) to the second-data-transmission-reception-unit #2 (802b in FIG. 8) and the network port #2 (801c in FIG. 8), will be explained, according to the present exemplary embodiment. And, regarding the above, the method of setting a new communication route, by creating a new VLAN interface in the second communication apparatus 802 and connecting it to the network port #3 (801d in FIG. 8) is also explained. Note that in the following explanation, the second-data-transmission-reception-units (802a through 802c in FIG. 8) in the second communication apparatus (802 in FIG. 8) are assumed to be used for some communication via each VLAN interface (802d through 802f in FIG. 8).

First, each component in the present exemplary embodiment is described with reference to FIG. 8.

The first communication apparatus 101 and the communication route changing apparatus 102 according to the present exemplary embodiment may be the same as those in the first exemplary embodiment, and therefore the detailed explanation thereof is omitted.

The routing apparatus 801 according to the present exemplary embodiment is a communication control apparatus supporting the virtual network (VLAN) environment. The routing apparatus 801 transfers communication data between the communication apparatuses connected to a network, based on the information of the communication routes in that virtual network environment.

The first communication route information storage 801e in the routing apparatus 801 stores the first communication route information being the information for controlling, for each network port, the communication routes on a virtual network on which the communication data is transmitted and received. FIG. 9 is a diagram illustrating a specific example of the first communication route information 901.

As illustrated in FIG. 9, a VLAN tag 901b is appended to the first communication route information 901 in addition to the communication route information (201 in FIG. 2) in the above-described first exemplary embodiment. The VLAN tag 901b is identification information that can identify a unique virtual network constructed in a virtual network environment.

The other components in the first communication route information 901 illustrated in FIG. 9 may be the same as each component in the first communication route information in the first exemplary embodiment illustrated in FIG. 2. That is, the input port 901a may be the same as the input port 201a in FIG. 2. The destination network address 901c may be the same as the destination network address 201b in FIG. 2. The gateway 901d may be the same as the gateway 201c in FIG. 2. The net mask 901e may be the same as the net mask 201d in FIG. 2. The output port illustrated in FIG. 9 may be the same as the output port 201e in FIG. 2. The detailed explanation of them is omitted.

Figure 8:
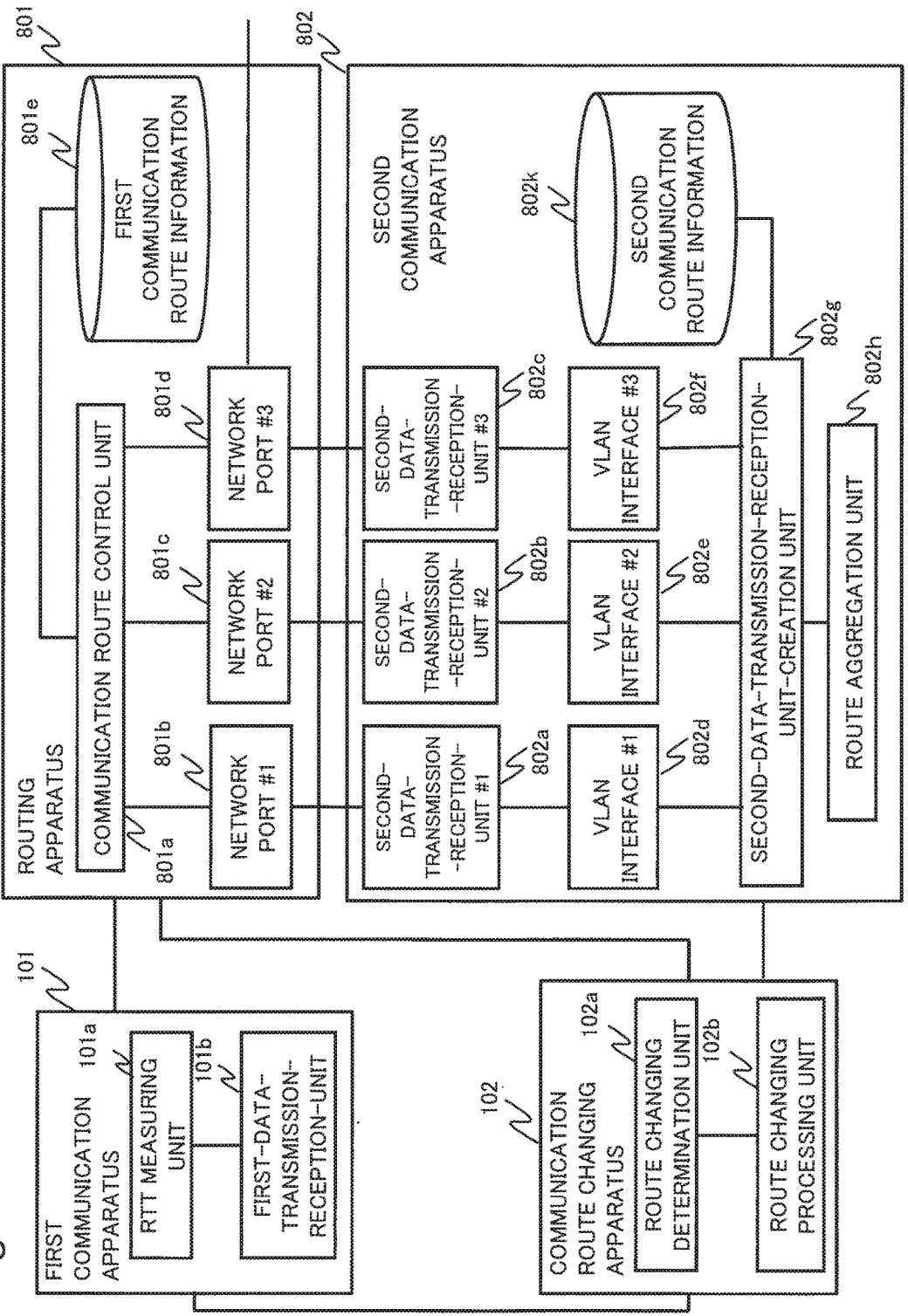
FIG. 8 is a block diagram illustrating a functional configuration of a communication processing system according to a second exemplary embodiment of the present invention.

Referring to FIG. 8, the routing apparatus 801 according to the present exemplary embodiment includes a network port #3 (801d) in addition to the configuration that the routing apparatus 103 according to the first exemplary embodiment illustrated in FIG. 1 includes.

Each of the network ports #1 through #3 (801b through 801d) in the routing apparatus 801 receives communication data (packet) from various types of communication apparatuses connected to a virtual network. Each of these network ports transmits the received communication data to the destination communication apparatus, based on the instruction of the communication route control unit 801a.

In addition, information related to the virtual network to which each network port belongs may be assigned to each of the network ports #1 through #3 (801b through 801d). More specifically, VLAN tag information that can identify the virtual network to which that network port belongs may be assigned to each of the network ports.

The second communication apparatus 802 according to the present exemplary embodiment further includes a second-data-transmission-reception-unit #3 (802c), a VLAN interface #1 (802d) through a VLAN interface #3 (802f) and a route aggregation unit 802h, in addition to the configuration included in the second communication apparatus 104 illustrated in FIG. 1.

The VLAN interfaces #1 through #3 (802d through 802f) in the second communication apparatus 802 provide a virtual network interface connectable to the above-described virtual network. More specifically, VLAN interfaces #1 through #3 (802d through 802f) may be a program creating such a virtual network interface in a computer, for example. Such a virtual network interface may be associated with a real network interface 407 illustrated in FIG. 4.

Figure 10:
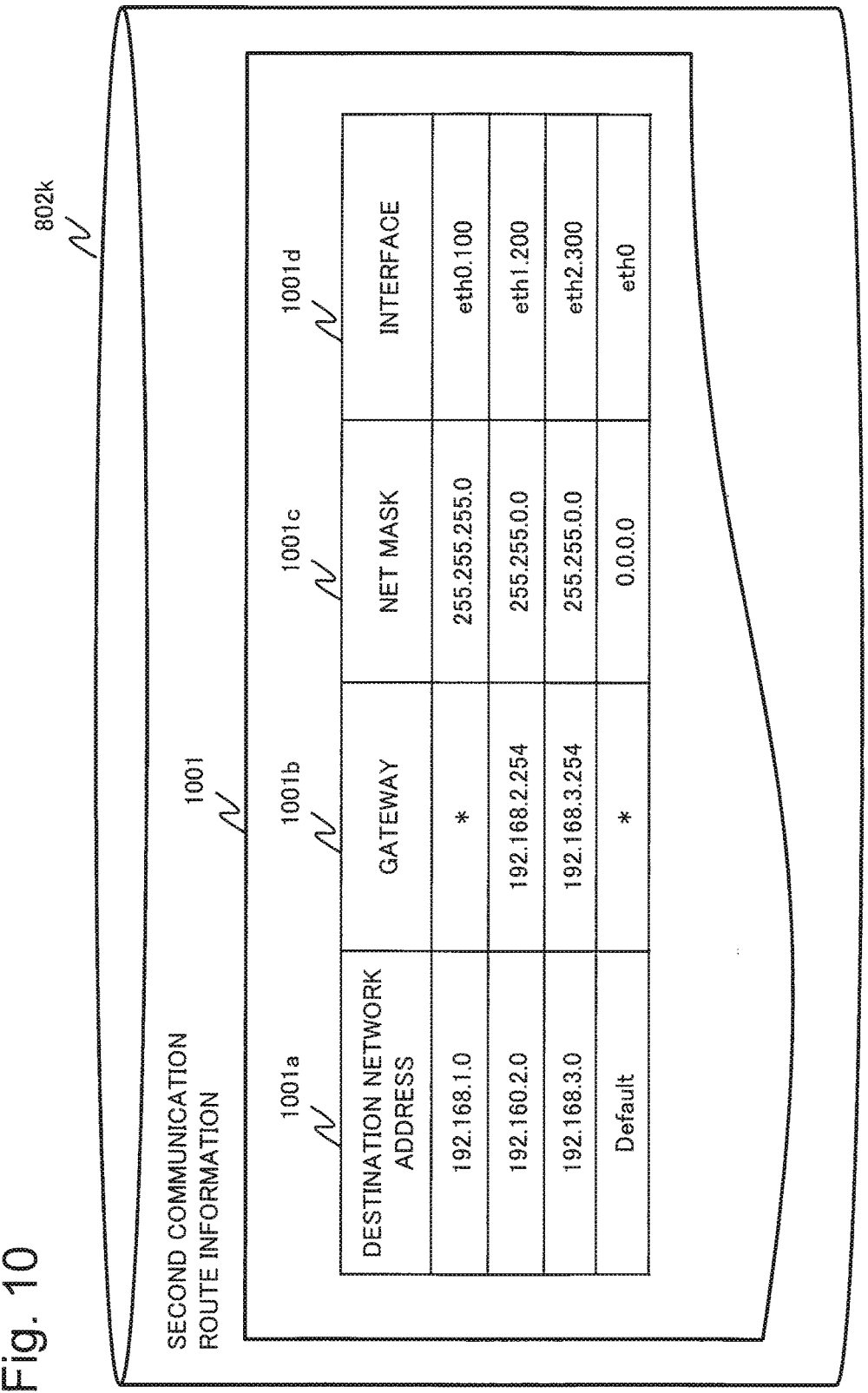
FIG. 10 is a diagram illustrating second communication route information before the communication routes are changed, according to the second exemplary embodiment of the present invention.

The second communication route information storage 802k may be equivalent to the second communication route information storage (104d) according to the above-described first exemplary embodiment. FIG. 10 is a diagram illustrating a specific example of the second communication route information (1001 in FIG. 10) stored in the second communication route information storage 802k according to the present exemplary embodiment. Note that the interface 1001d in the second communication route information 1001 may include information that can identify the above-explained VLAN interface.

The route aggregation unit 802h in the second communication apparatus 802 aggregates the communication routes connecting between each communication apparatus connected to the mentioned virtual network, based on the instruction of the route changing processing unit 102b. More specifically, when for example, there are two communication routes connecting between each communication apparatus, the route aggregation unit 802h may stop using one of the communication routes and aggregate the communication route into the other communication route. Note that the specific operations of the route aggregation unit 802h are described later.

In the following, a specific example of the network lines according to the present exemplary embodiment will be described with reference to FIG. 11.

Figure 11:
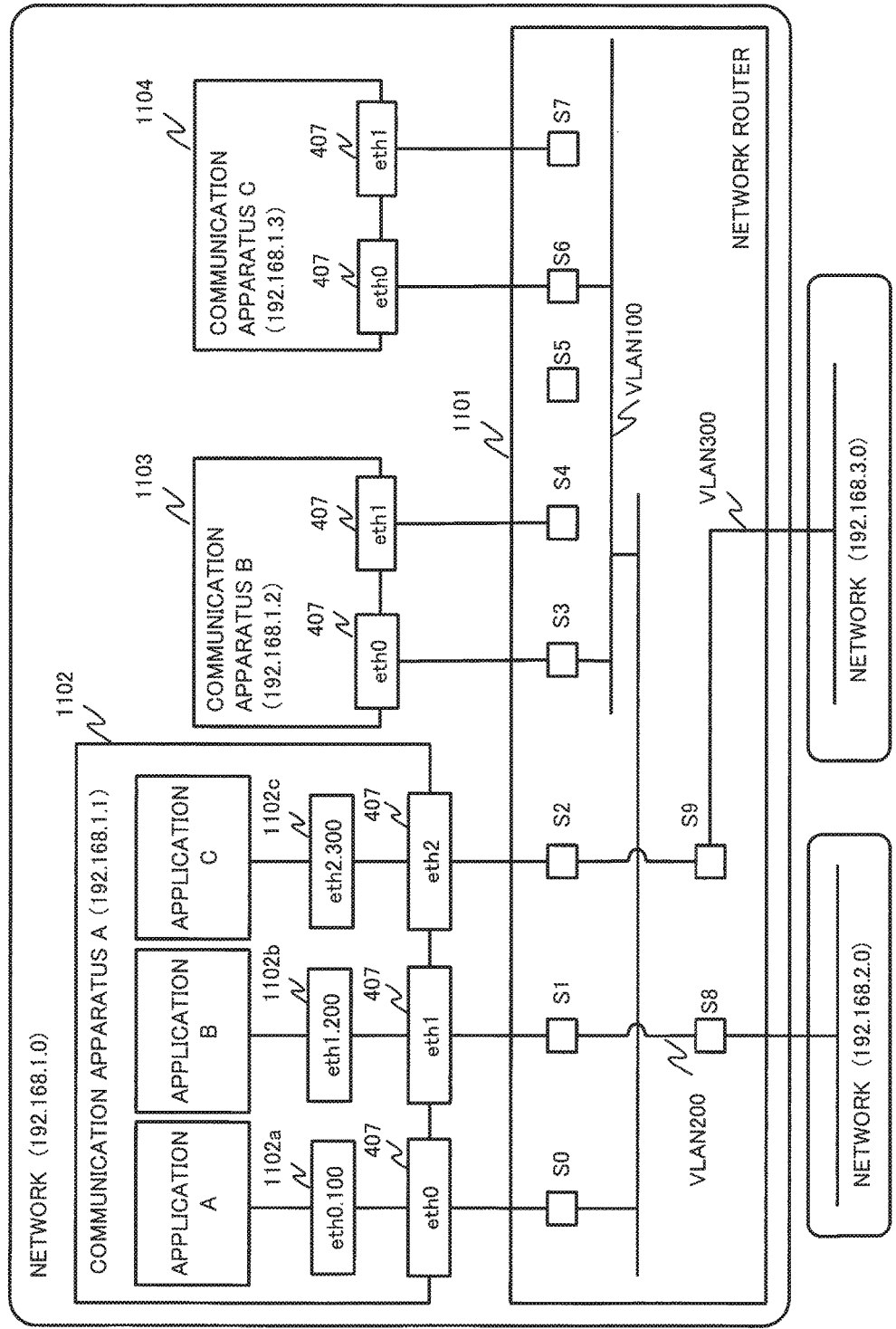
FIG. 11 is a diagram illustrating a specific example of network lines before the communication routes are changed, according to the second exemplary embodiment of the present invention.

In FIG. 11, the network router 1101 corresponds to the routing apparatus 801 illustrated in FIG. 8, and has the configuration and function similar to those of the routing apparatus 801. Likewise, the communication apparatus "A" (1102) in FIG. 11 corresponds to the second communication apparatus 802 illustrated in FIG. 8. The communication apparatus "B" (1103) in FIG. 11 corresponds to the first communication apparatus 101 illustrated in FIG. 8.

The VLAN (the VLAN 100, the VLAN 200, the VLAN 300 and the like illustrated in FIG. 11) represents a plurality of virtual networks set to the network router 1101. The VLAN is composed of a VLAN interface (e.g., the 802d through 802f illustrated in FIG. 8) and a network router 1101.

The application (application "A" through application "C") executed in the communication apparatus "A" illustrated in FIG. 11 transmits communication data to the network router 1101 through the VLAN interfaces (1102a through 1102c illustrated in FIG. 11). Hereinafter, the 1102a through 1102c in FIG. 11 may be simply referred to as "VLAN interface". In this case, actual transmission processing may be executed via the real network interfaces 407 being associated with the respective VLAN interfaces.

When communication data is transmitted from the VLAN interface to the network router 1101, identification information called "VLAN tag" is added to the communication data. Such a VLAN tag is information for identifying a virtual network, and may be represented by a certain numerical value, for example.

Each network port (S0 through S9 illustrated in FIG. 11; hereinafter simply referred to as "network port") in the network router 1101 is provided a setting which specifies which of the VLANs it belongs. More specifically, each network port may be assigned VLAN tag information related to the VLAN to which it belongs.

The network router 1101 checks the VLAN tag of the communication data having arrived, and transfers the communication data only to the network port belonging to the corresponding VLAN.

In the specific example illustrated in FIG. 11, the network ports S0, S3 and S6 belong to the VLAN identified by the VLAN tag "100" (hereinafter simply referred to as VLAN 100). The network ports S1 and S8 belong to the VLAN identified by the VLAN tag "200" (hereinafter simply referred to as VLAN 200). The network ports S2 and S9 belong to the VLAN identified by the VLAN tag "300" (hereinafter simply referred to as VLAN 300).

Note that the configuration of the VLAN 100, the VLAN 200, and the VLAN 300 illustrated in FIG. 11 is a specific example, and the present exemplary embodiment is not limited to this. Each VLAN may be configured by any communication device (not illustrated in the drawings) connected to the port assigned a VLAN tag. In addition, the VLAN 200 and the VLAN 300 are not limited to a device directly connected to the network port S8 or S9.

In the specific example illustrated in FIG. 11, the network port S0 corresponds to the network port #1 (801b). The network port S1 corresponds to the network port #3 (801d). The network port S2 corresponds to the network port #2 (801c).

In the specific example illustrated in FIG. 11, the VLAN interface "eth0.100" (1102a) corresponds to the VLAN interface #1 (802d) illustrated in FIG. 8. The VLAN interface "eth1.200" (1102b) corresponds to the VLAN interface #3 (802f) illustrated in FIG. 8. The VLAN interface "eth 2.300" (1102c) corresponds to the VLAN interface #2 (802e) illustrated in FIG. 8.

For example, the VLAN tag "100" is assigned to the communication data transmitted from the VLAN interface 1102a ("eth0.100") in the communication apparatus "A" (1102), and that communication data is transmitted to the network port "S0" of the network router 1101.

Likewise, the VLAN tag "200" is assigned to the communication data transmitted from the VLAN interface 1102b ("eth1.200") in the communication apparatus "A" (1102), and that communication data is transmitted to the network port "S1" of the network router 1101.

Likewise, the VLAN tag "300" is assigned the communication data transmitted from the VLAN interface 1102c ("eth2.300") in the communication apparatus "A" (1102) and that data is transmitted to the network port "S2" of the network router 1101.

The network router 1101 extracts, from the arrived communication data, the VLAN tag (e.g., VLAN tags "100", "200", "300" and the like), and transfers the communication data to the network port belonging to the VLAN and designated as the destination.

Such a VLAN is used, for example, when a network environment (communication route etc.) is established for each of the applications executed in a specific communication apparatus (including the information processing apparatus) connected to a virtual network, individually. A specific example of such an application is a virtual machine that virtualizes an information processing apparatus.

The operation of the communication processing system according to the present exemplary embodiment configured as above is described below. In the following explanation, in the normal state before execution of separation processing of the communication route, it is assumed that the route information illustrated in FIG. 9 (the first communication route information; 901 in FIG. 9) is set into the first communication route information storage 801e. In addition, it is assumed that the route information illustrated in FIG. 10 (the second communication route information; 1001 in FIG. 10) is set into the second communication route information storage 802k.

Figure 12:
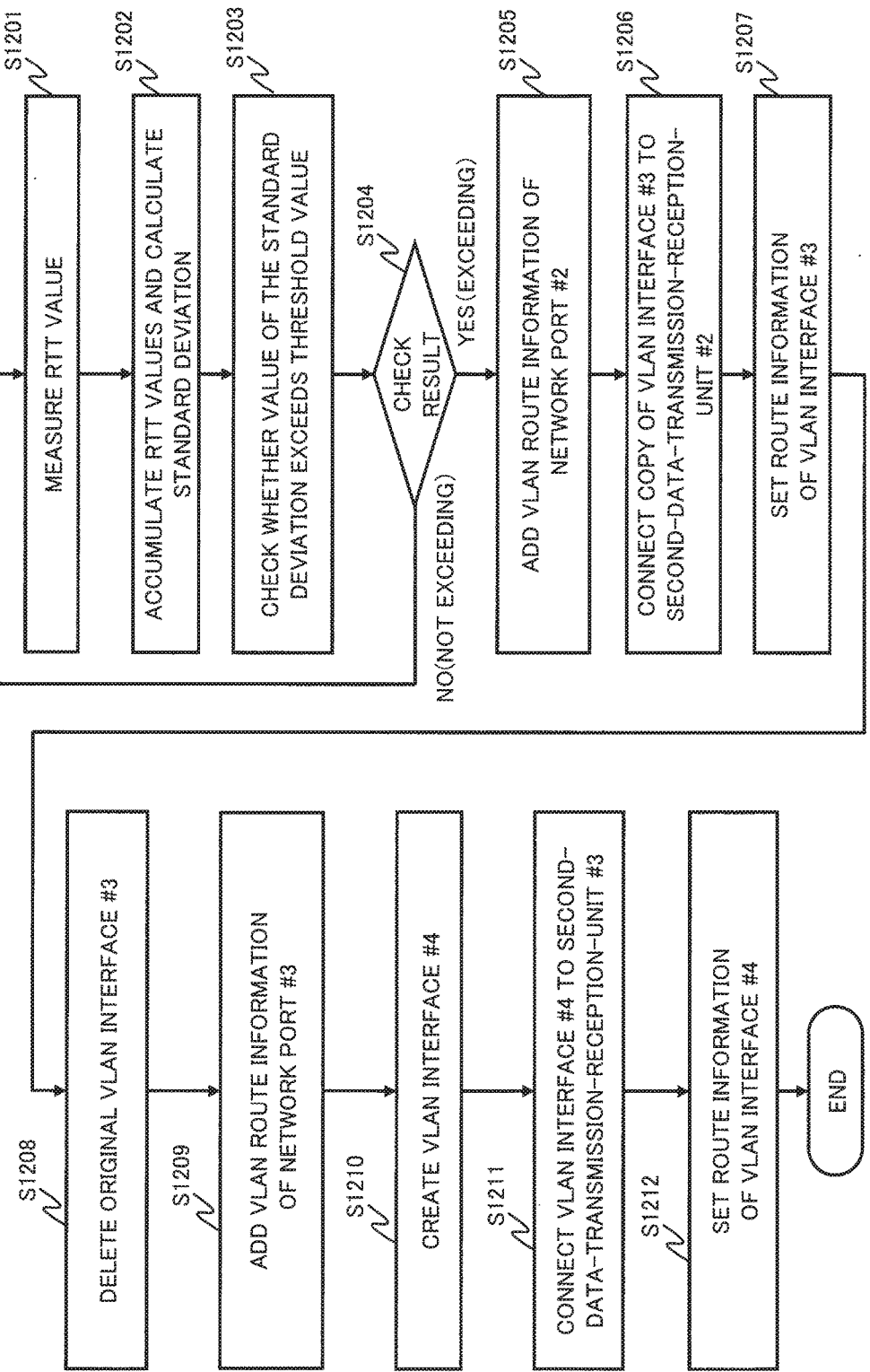
FIG. 12 is a flowchart illustrating a changing process of a communication route according to the second exemplary embodiment of the present invention.

FIG. 12 is a flowchart illustrating the separation processing of the communication route according to the present exemplary embodiment.

First, Step S1201 through Step S1204 in FIG. 12 may be processing similar to Step S501 through Step S504 in FIG. 5 explained in the first exemplary embodiment described above, and therefore the detailed explanation is omitted.

Next, if the result of Step S1204 is "Yes", the route changing processing unit 102b instructs the route aggregation unit 802h in the second communication apparatus 802 to change the communication route.

Figure 13:
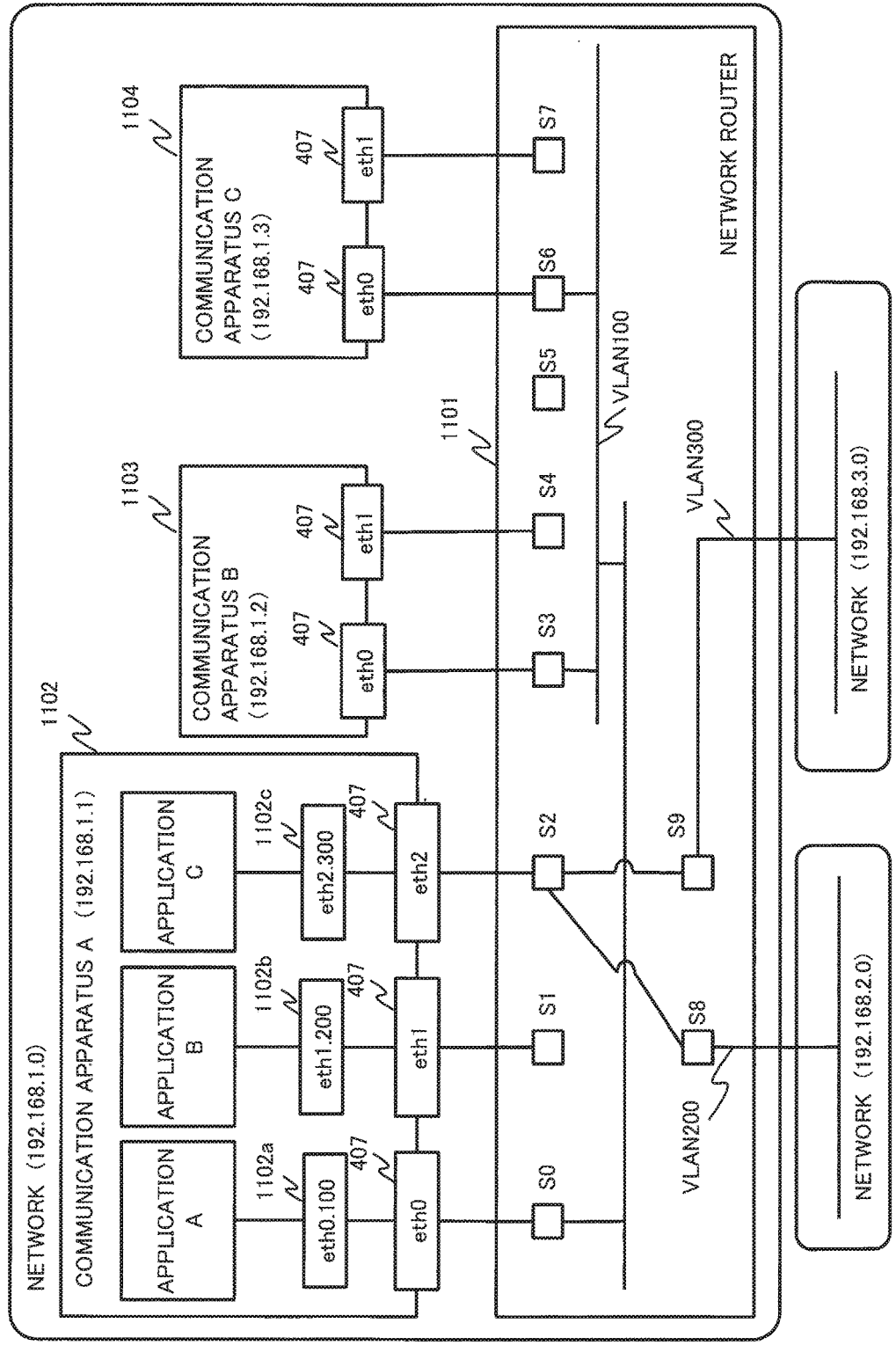
FIG. 13 is a diagram illustrating a changing process of a communication route according to the second exemplary embodiment of the present invention.

The route aggregation unit 802h, having received the instruction explained above, adds the VLAN route information of the network port #2 (801c), to the first communication route information in network router 1101 (corresponding to the routing apparatus 801) (Step S1205, and FIG. 13). This VLAN route information is route information for transferring the communication data transmitted and received in the VLAN interface #3 (802f).

Before execution of Step S1205, the communication data transmitted and received by the VLAN interface #3 (802f) is transmitted and received to and from the network port "S1" via the VLAN interface "eth1.200" (1102b) in FIG. 11. The VLAN interface #3 belongs to the VLAN identified by the VLAN tag "200" as described above.

The route aggregation unit 802h adds the VLAN route information regarding the network port #2(801c), so as to aggregate the communication route related to the VLAN tag "200" to the network port #2, in the processing of Step S1205. As described above, the network port #2 (801c) corresponds to the network port S2 in the network router.

Specifically, the VLAN route information being added to the network port #2(801c) is information representing below. That is, such VLAN route information is information representing that "the network port S2 can receive the communication to which the VLAN tag '200' is assigned". In addition, the VLAN route information indicates "the network port S2 transfer the received communication data, to which the VLAN tag "200" is assigned, to the network port to which the VLAN tag '200' is assigned".

The network port S2 (network port #2 (801c)) to which the route information being set, belongs to both virtual networks VLAN 200 and VLAN 300, as illustrated in FIG. 13. Then, the network port S2 transmits and receives the communication data to which the VLAN tag "200" is assigned and the communication data to which VLAN tag "300" is assigned.

In Step 1205 described above, the route changing processing unit 102b may delete the information of the original communication route set to the network port #3 (801d).

Note that the present exemplary embodiment is not limited to the above, and may be such that the route changing processing unit 102b execute the above-described S1205, or that the route changing processing unit 102b instruct the routing apparatus 801 to perform the above-described S1205.

Figure 14:
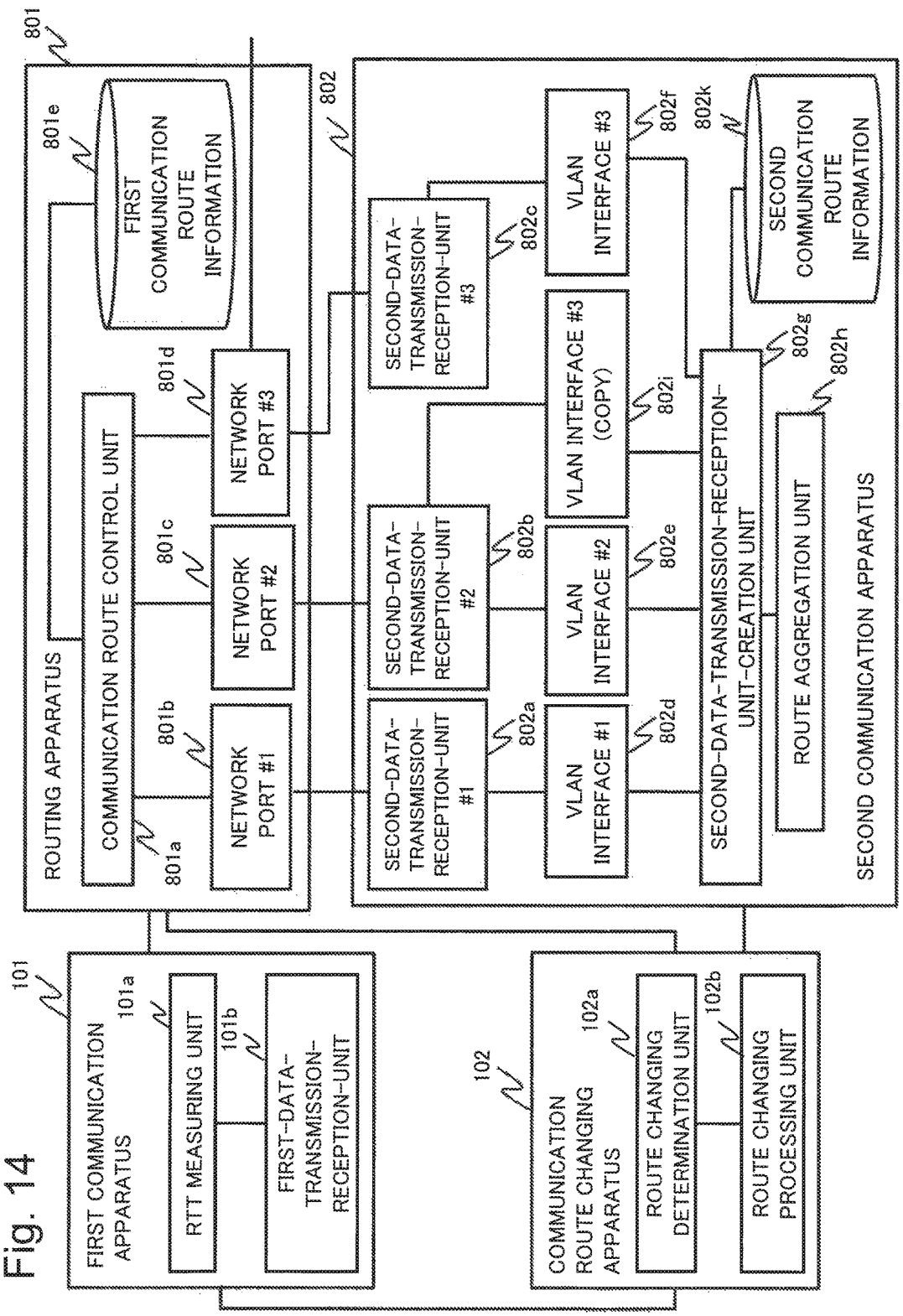
FIG. 14 is a diagram illustrating a changing process of a communication route according to the second exemplary embodiment of the present invention.

Next, the route aggregation unit 802h may create a copy of the VLAN interface #3(802f) (802i in FIG. 14), and connects that copy to the second-data-transmission-reception-unit #2 (802b) (Step S1206, and FIG. 14). Here, that copied VLAN interface #3 (802i) corresponds to "eth2.200" in the network lines diagram illustrated in FIG. 15.

Figure 15:
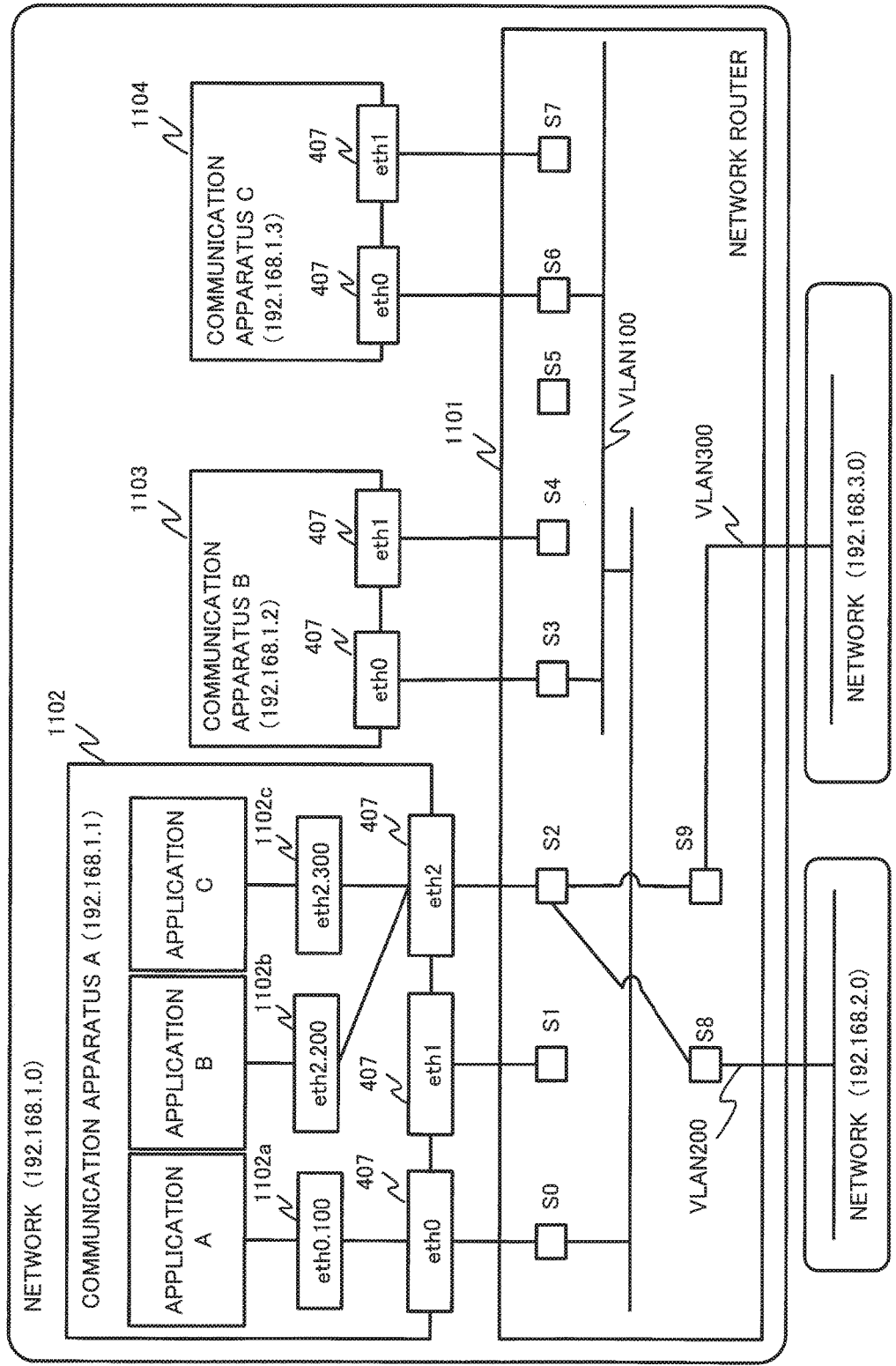
FIG. 15 is a diagram illustrating a changing process of a communication route according to the second exemplary embodiment of the present invention.

Next, the route aggregation unit 802h sets the route information of the copied VLAN interface #3 (802i) to the second communication route information in the second communication apparatus 802 (Step S1207, and FIG. 15).

The route information set in Step S1207 is information for setting the communication data to which the VLAN tag "200" is set, to be transferred via the VLAN interface "eth2.200". Note that at this stage, the route aggregation unit 802h may associate the VLAN interface "eth2.200" with the real network interface "eth2" (FIG. 15).

Next, the route aggregation unit 802h deletes the original VLAN interface #3 (802f) (Step S1208).

Figure 16:
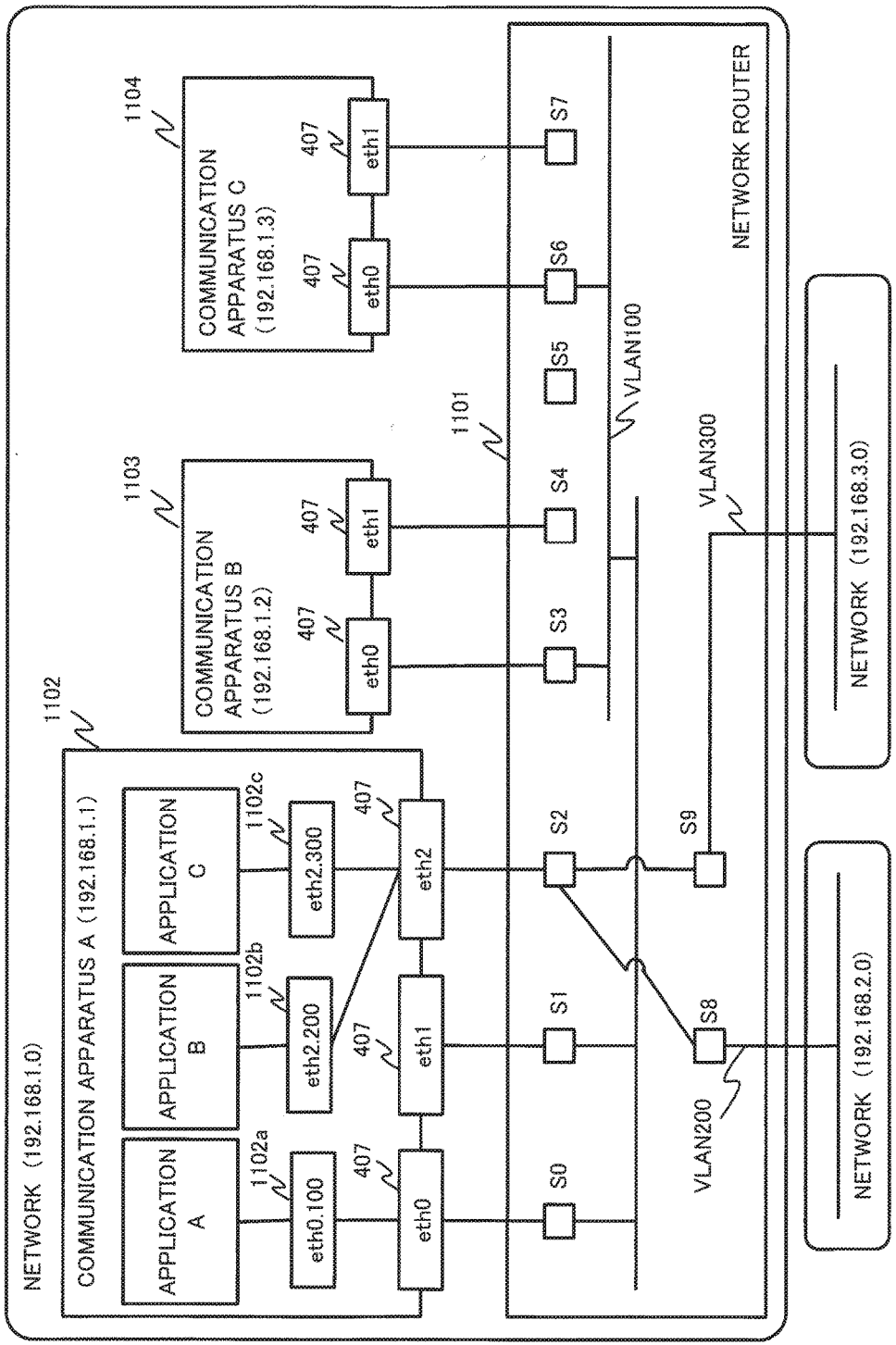
FIG. 16 is a diagram illustrating a changing process of a communication route according to the second exemplary embodiment of the present invention.

According to the above processing, the communicate route of the VLAN 200 and the VLAN 300 is aggregated to use the network port S2 in the network router 1101 (FIG. 16).

Next, the route aggregation unit 802h adds the VLAN route information of the network port #3(801d) to the first communication route information in the network router 1101 (Step S1209).

That VLAN route information represents specifically the following information. Such VLAN route information is information representing "the network port S1 can receive the communication data to which the VLAN tag '100' is assigned ". In addition, the VLAN route information indicates, "the network port S1 transfers the received communication data to which the VLAN tag '100' is assigned, to the network port to which the VLAN tag '100' is assigned". By this, the network port S1 (network port #3 (801d) in FIG. 8) assigned that route information belongs to the virtual network of the VLAN 100 as illustrated in FIG. 16.

A specific example of the first communication route information to which that route information is set is illustrated in FIG. 19 (901 in FIG. 19).

Figure 17:
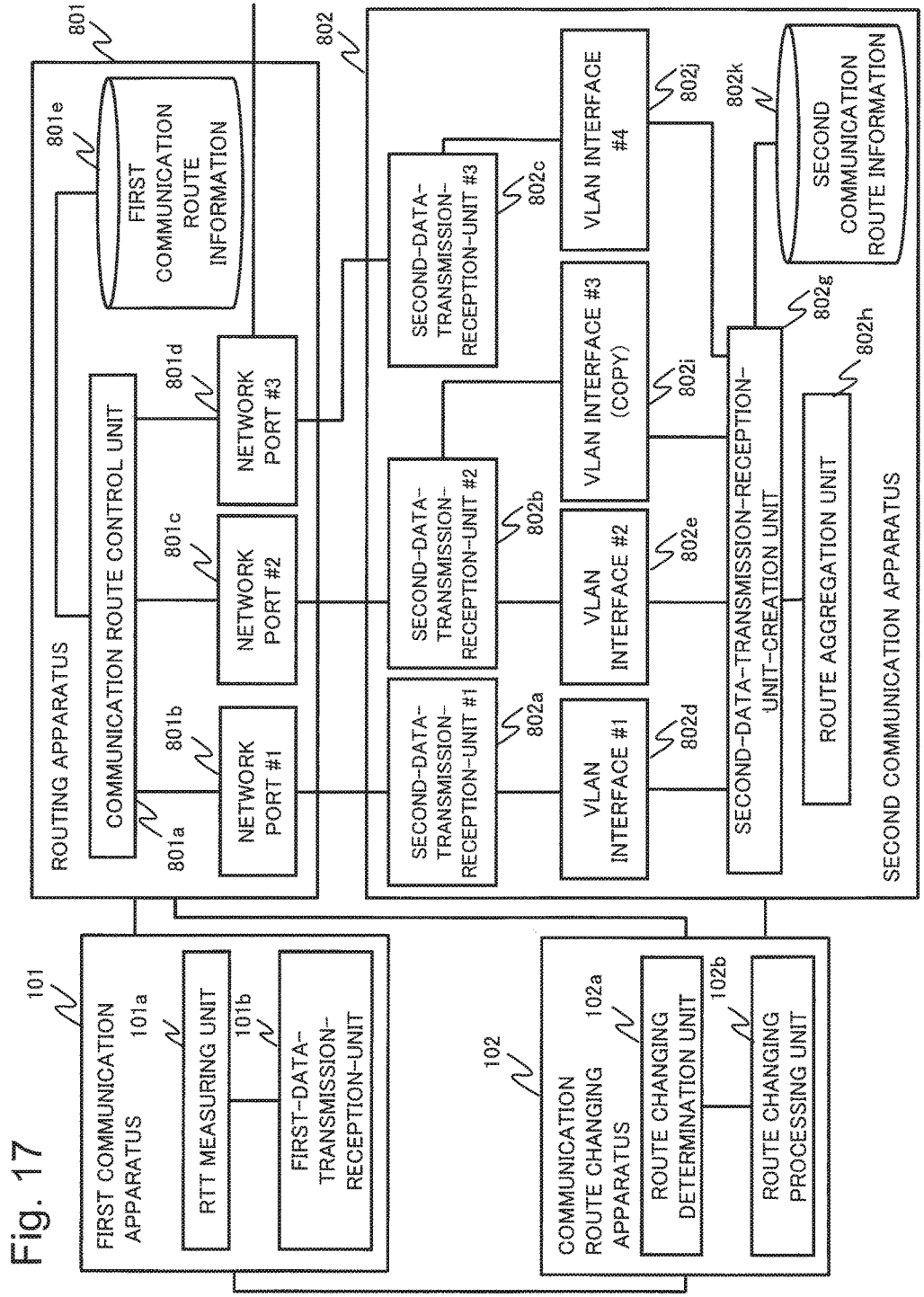
FIG. 17 is a diagram illustrating a changing process of a communication route according to the second exemplary embodiment of the present invention.

Next, the route aggregation unit 802h instructs the second-data-transmission-reception-unit-creation unit 802g to create a new VLAN interface. The second-data-transmission-reception-unit-creation unit 802g, based on such an instruction, creates the VLAN interface #4 (802j in FIG. 17) (Step S1210). That VLAN interface #4 (802j) corresponds to "eth1.100" (1102d) in the network lines diagram illustrated in FIG. 18.

Next, the second-data-transmission-reception-unit-creation unit 802*g* connects the VLAN interface #4 (802*j* in FIG. 17) to the second-data-transmission-reception-unit #3 (802*c*) (Step S1211).

Next, the route aggregation unit 802*h* sets the route information of the VLAN interface #4 (802*j*) to the second communication route information (Step S1212). Such route information is set so that the communication data to which the VLAN tag "100" is assigned is transferred by the VLAN interface "eth0.100" or "eth1.100", for example.

Figure 20:
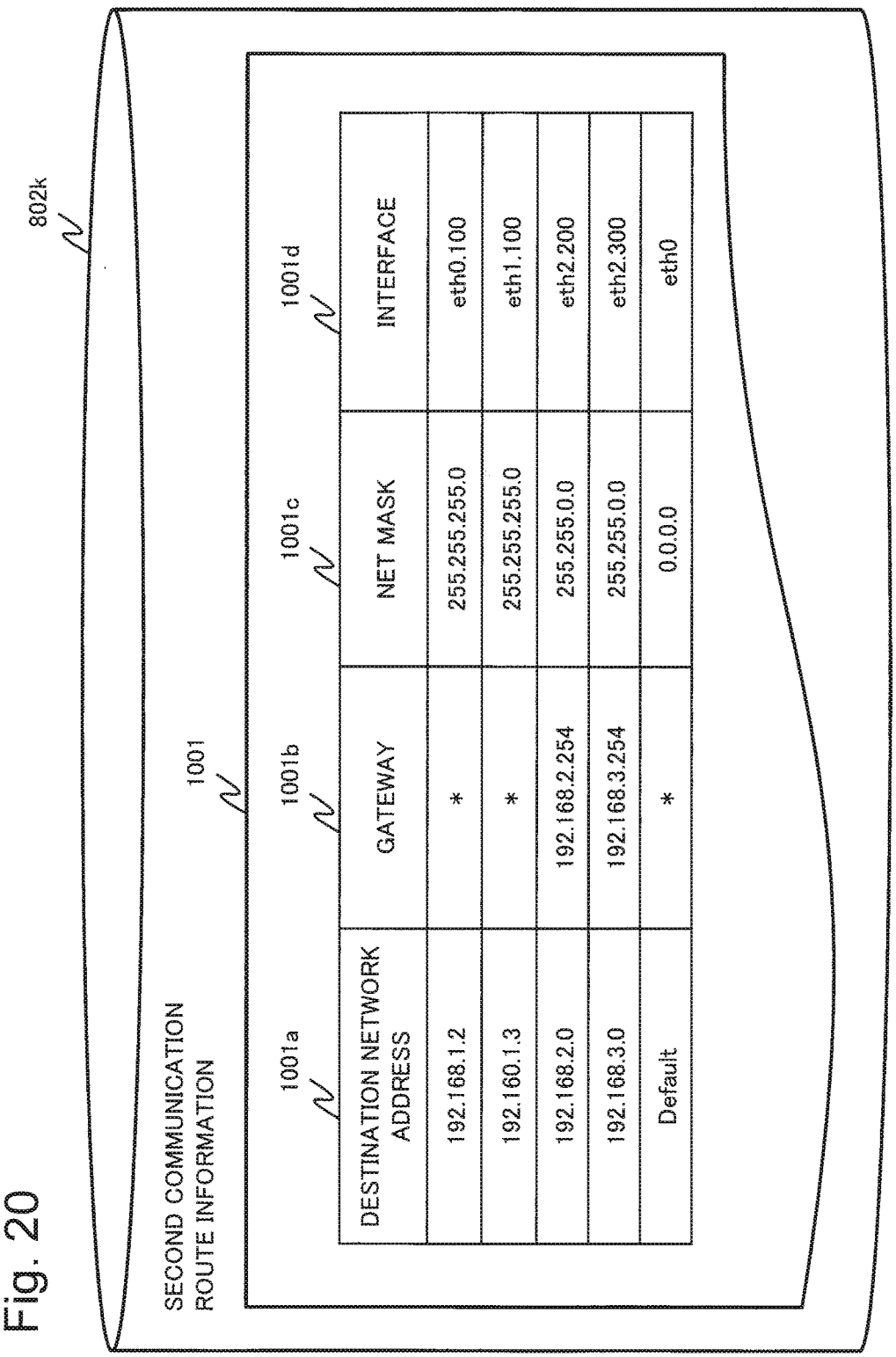
FIG. 20 is a diagram illustrating the second communication route information after the communication routes are changed, according to the second exemplary embodiment of the present invention.

FIG. 20 illustrates a specific example of the second communication route information assigned the route information of the VLAN interface #4 (802*j*) (1001 of FIG. 20).

Note that the route aggregation unit 802*h* may instruct the second communication apparatus 802 to set the route information of VLAN interface #4.

According to the above processing, the communication route of the VLAN 100 is set to use multiple communication routes, by use of the network ports S1 and S2 in the network router.

Figure 18:
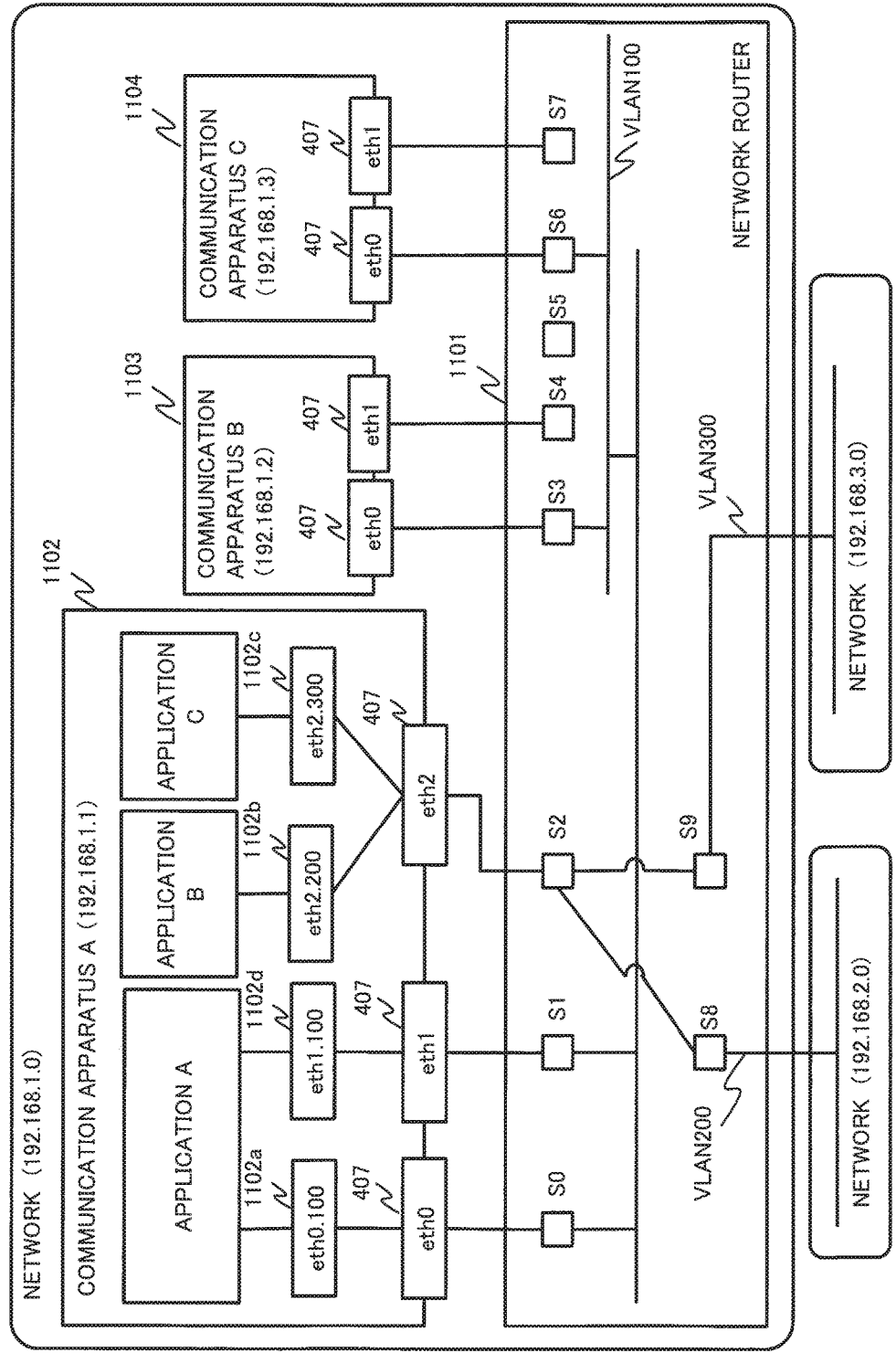
FIG. 18 is a diagram illustrating a specific example of network lines after the communication routes are changed, according to the second exemplary embodiment of the present invention.

FIG. 18 illustrates a network lines diagram when the network separation processing explained above is executed.

According to the communication processing system according to the present exemplary embodiment configured as above, when the RTT measurement result exceeds a certain threshold value, a plurality of communication routes are aggregated into a part of the communication routes. Then, as a result of such aggregation, the communication routes that become no longer in use as a result of the aggregation, are used as multiple communication routes for the other communications.

Also according to the communication processing system according to the present exemplary embodiment, it is possible to aggregate the communication routes regardless of whether there is a communication route unused for transmission and reception of data.

Therefore, the communication processing system according to the present exemplary embodiment has an effect similar to that of the above-described first exemplary embodiment. The communication processing system according to the present exemplary embodiment also can reduce the possibility of degradation of the real-time characteristics in a certain communication, by providing multiple communication route for the certain communication.

As described above, according to the communication processing system according to the present exemplary embodiment, it is possible to construct communication routes not susceptible to delays occurring in a part of the communication routes.

<Third Exemplary Embodiment>

Next, the third exemplary embodiment according to the present invention is described. The following mainly explains the characteristic portion of the present exemplary embodiment, and omits the explanation overlapping with the configuration similar to that of the above-described first exemplary embodiment and second exemplary embodiment.

As described later, the communication processing system according to the present exemplary embodiment is different from each of the above-described exemplary embodiments, in that it sets the communication routs so as to equalize the load of communication processing for each network port in the routing apparatus (e.g., 2101 illustrated in FIG. 21). The following focuses on this difference.

Figure 21:
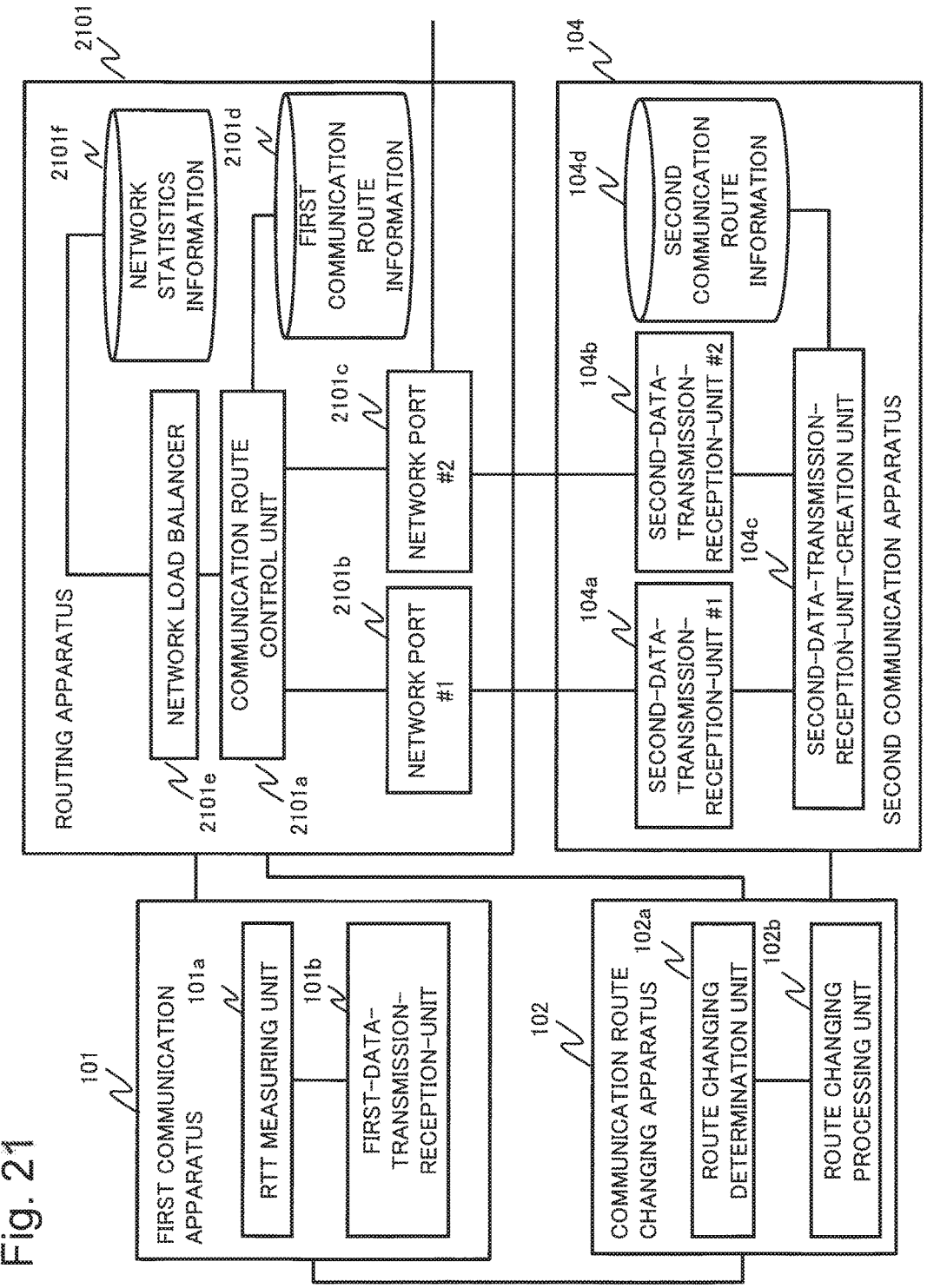
FIG. 21 is a block diagram illustrating a functional configuration of a communication processing system according to a third exemplary embodiment of the present invention.

As illustrated in FIG. 21, the routing apparatus 2101 according to the present exemplary embodiment further includes a network load balancer 2101*e* and a network statistics information storage 2101*f*, in addition to the configuration of the routing apparatus 103 in the above-described first exemplary embodiment.

The network load balancer 2101*e* rewrites the communication route information registered in the first communication route information storage 2101*d*, so as to allocate equally the load related to the communication processing, to each network port (2101*b*, 2101*c*). The specific operation of the network load balancer 2101*e* is described later.

Figure 22:
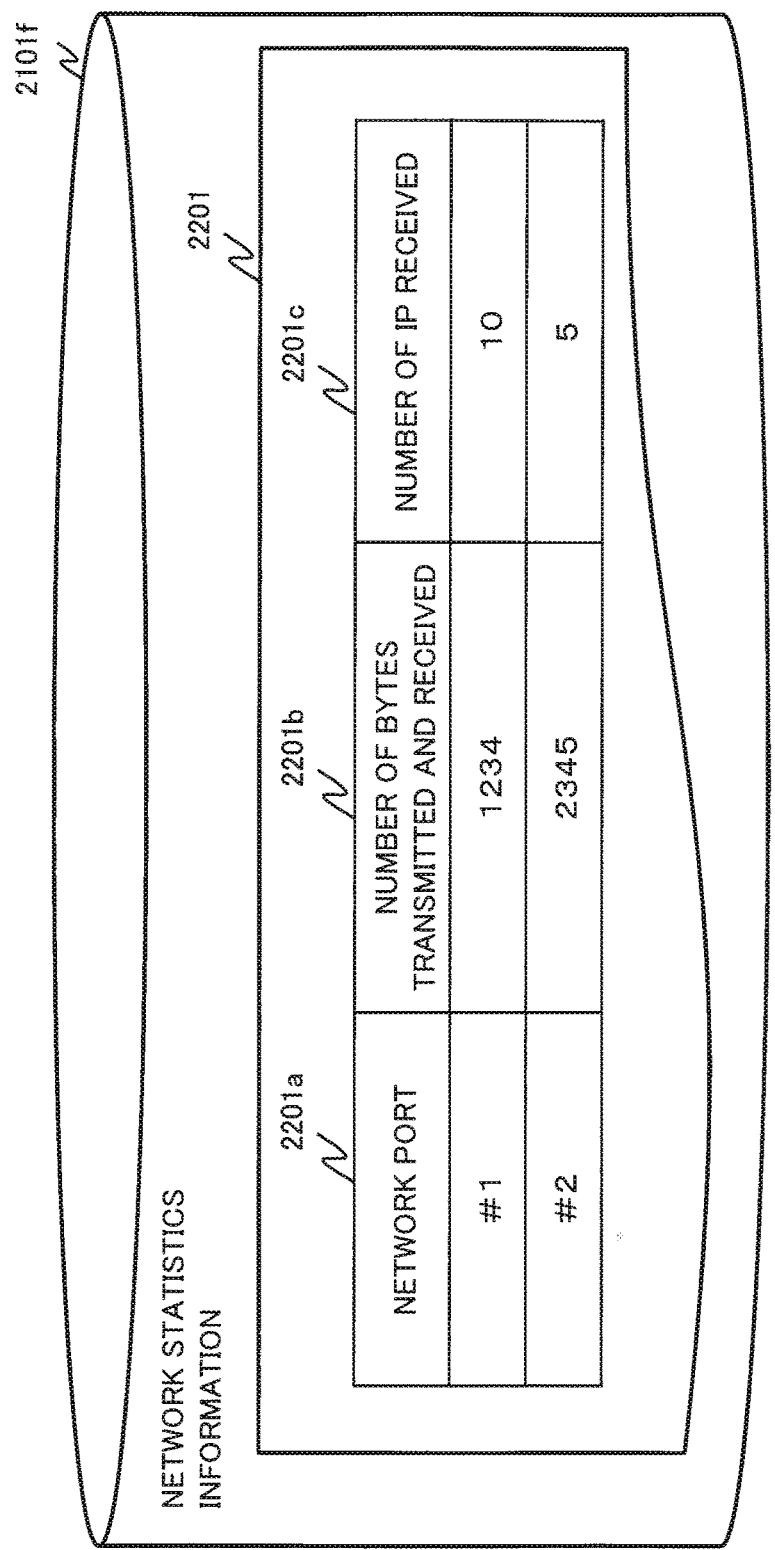
FIG. 22 is a diagram illustrating a specific example of network statistics information according to the third exemplary embodiment of the present invention.

The network statistics information storage 2101*f* stores (records) network statistics information, representing the statistics information of communication data transmitted and received on each network port. FIG. 22 is a diagram illustrating a specific example of the network statistics information (2201 in FIG. 22) stored in the network statistics information storage 2101*f*. Hereinafter, the network statistics information stored in the network statistics information storage 2101*f* may be simply referred to as "network statistics information".

The network statistics information 2201 is composed of the network port 2201*a*, the number of bytes transmitted and received 2201*b* and the number of IPs received 2201*c*. The network port 2201*a* represents each network port (2101*b*, 2101*c*) of the routing apparatus 2101. The number of bytes transmitted and received 2201*b* represents the total data size that represents the total volume of communication data transmitted and received by each network port. The number of IPs received 2201*c* represents the number of IPs received on each network port. Such number of IPs received may represent the number of communication apparatuses having transmitted or received communication data with each network port. The number of bytes transmitted and received 2201*b* explained above may be the total volume of communication data transmitted or received by each network port within a predetermined period.

The communication route control unit 2101*a* constituting the routing apparatus 2101 may be the same as the communication route control unit 103*a* according to the above-described first exemplary embodiment. Likewise, the network port #1 (2101*b*) may be the same as the network port #1 (103*b*) according to the above-described first exemplary embodiment. The network port #2 (2101*c*) may be the same as the network port #2 (103*c*) according to the above-described first exemplary embodiment. The first communication route information storage (2101*d*) storing (keeping) the first communication route information may be the same as the first communication route information storage (103*d*) according to the above-described first exemplary embodiment. The detailed description related to them is omitted.

The first communication apparatus 101, the communication route changing apparatus 102 and the second communication apparatus 104 according to the present exemplary embodiment may be the same as those in the first exemplary embodiment, and therefore the detailed description is omitted.

Note that the specific example of the network lines that can realize the communication processing system in the present exemplary embodiment may be the same as the specific example illustrated in FIG. 4.

The operation of the communication processing system according to the present exemplary embodiment configured as above is described below.

First, the network load balancer 2101*e* in the routing apparatus 2101 checks the total data size of the communication data transmitted and received by each network port by referring to the network statistics information.

In this case, the network load balancer 2101*e* may check the total data size of the communication data for example at a certain time interval, or may check the total data size of the communication data at a certain timing. Note that the network load balancer 2101e may check the above-described total data size of the communication data for example when the RTT measured in the RTT measuring unit 101a exceeds a certain threshold value.

The network load balancer 2101e checks the number of bytes transmitted and received 2201b, in the network statistics information 2201. Based on the check result, the network load balancer 2101e changes the communication route so as to assign the destination network address set to the network ports of which number of bytes transmitted and received 2201b is larger, to the network port of which number of bytes transmitted and received 2201b is smaller.

In the specific example illustrated in FIG. 22, the number of bytes transmitted and received for the network port #1 (2101b) is smaller than the number of bytes transmitted and received for the network port #2 (2101c). Therefore, the network load balancer 2101e changes the first communication route information stored in the first communication route information storage 2101d so as to set the destination network address having been set to the network port #2 (2101c), to the network port #1 (2101b).

Figure 23:
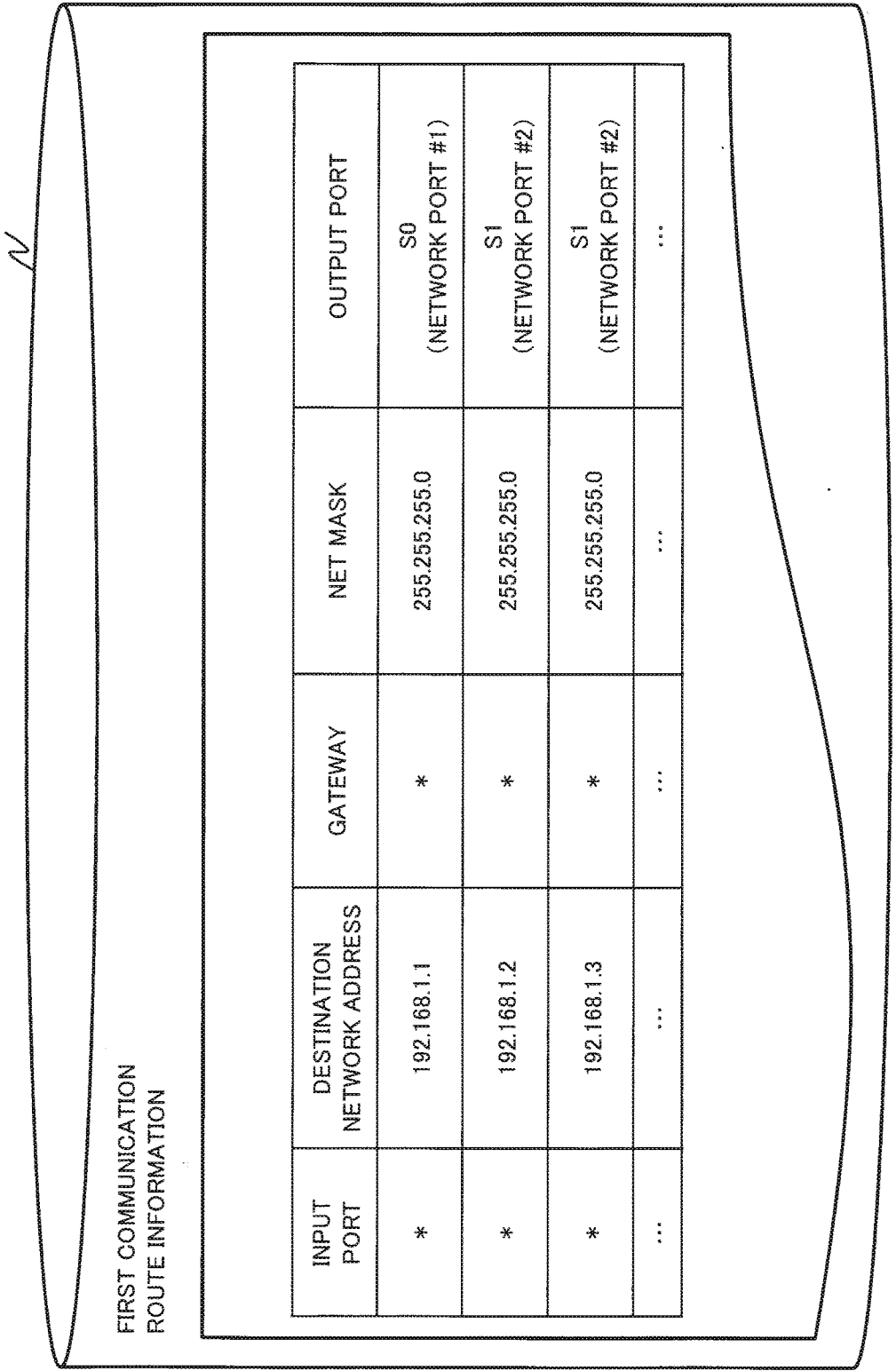
FIG. 23 is a diagram illustrating first communication route information before the communication routes are changed, according to the third exemplary embodiment of the present invention.

In the following, explanation will be made with reference to the specific example illustrated in FIG. 23. It is assumed that, when the network load balancer 2101e checks the number of bytes transmitted and received 2201b for each network port, the communication route illustrated in FIG. 23 is set to the first communication route information storage 2101d. That is, the destination network address "192.168.1.1" is assumed to be set to the network port #1 (2101b) and "192.168.1.2" and "192.168.1.3" are assumed to be set to the network port #2 (2101c).

In this case, the network load balancer 2101e changes the first communication route information so that the communication data directed to any of the destination network addresses set to the network port #2 (2101c) be transmitted from the network port #1 (2101b). That is, the network load balancer 2101e changes the first communication route information so that the communication data directed to any of the destination network addresses "192.168.1.2" or "192.168.1.3" be transmitted from the network port #1 (2101b).

Note that in the above, the load of the communication processing is balanced for each network port, based on the number of bytes transmitted and received 2201b. However, the present exemplary embodiment is not limited to this. The network load balancer 2101e may rewrite the information of the communicate route so that the number of IPs received 2201c be equalized, for example.

According to the communication processing system in the above-described present exemplary embodiment, the communication route is changed so that the load of communication processing is equalized between each network port included in the routing apparatus. More specifically, the destination network address for transmission and reception through each network port is set so that the total volume of communication data transmitted and received through each network port in the routing apparatus is equalized.

Consequently, it is possible to equalize the communication load of each network port included in the routing apparatus. It is also possible to distribute equally the load of communication processing in the second-data-transmission-reception-unit in the second communication apparatus connected to that network port.

According to the communication processing system according to the present exemplary embodiment, the load related to the communication processing in the routing apparatus and the second communication processing apparatus is balanced, and therefore it is possible to reduce the occurrence of delay on the communication route.

Note that the network load balancer 2101e in the above-described present exemplary embodiment can be combined into the communication processing systems according to the first and second exemplary embodiments. In that case, the communication processing system according to the present exemplary embodiment has the same effect as that of the communication processing systems according to the first and second exemplary embodiments.

<Fourth Exemplary Embodiment>

Figure 26:
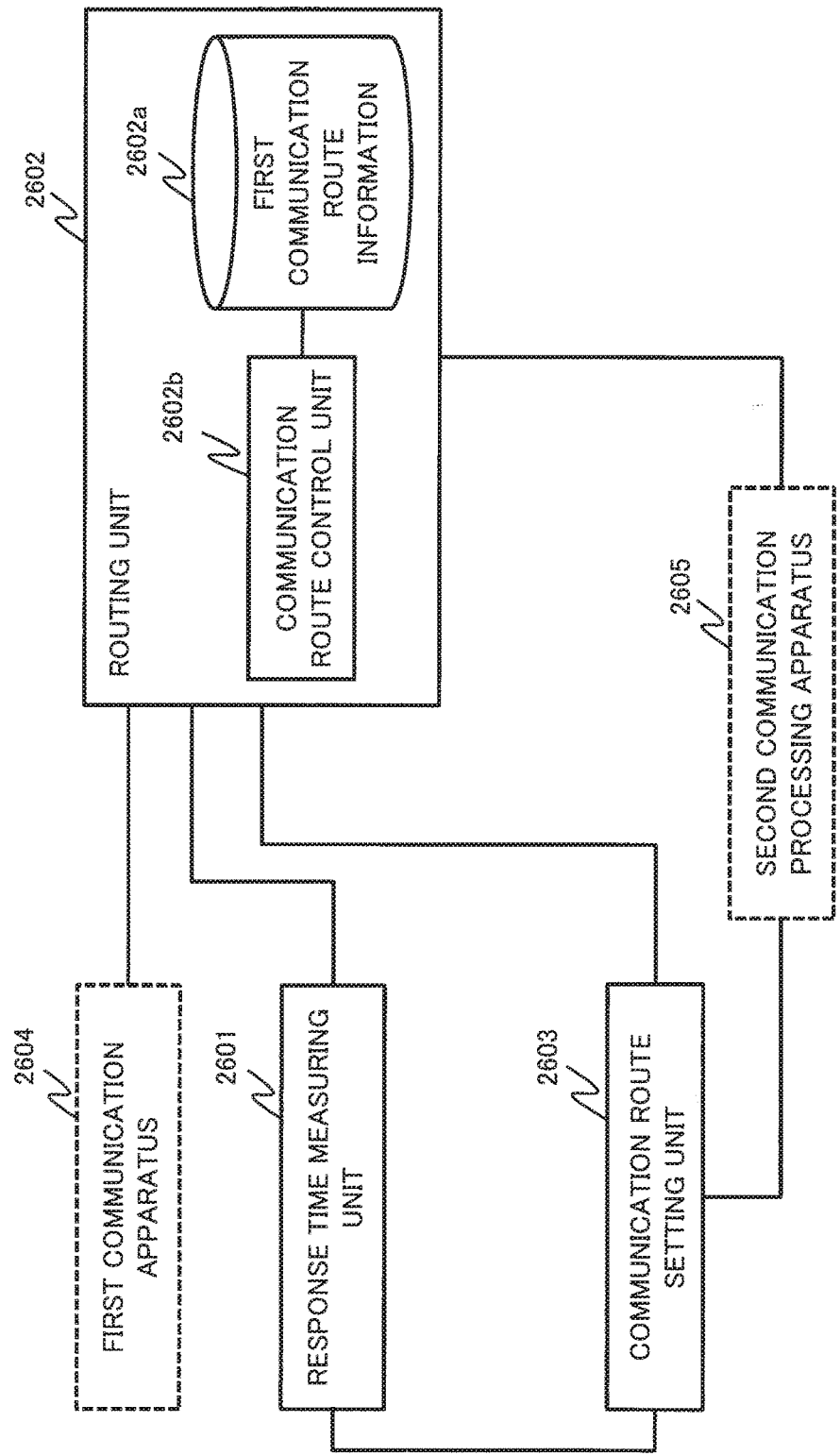
FIG. 26 is a block diagram illustrating a functional configuration of a communication processing system according to a fourth exemplary embodiment of the present invention.

The following describes the configuration common to each exemplary embodiment described above, as the fourth exemplary embodiment of the present invention, with reference to FIG. 26.

The communication processing system according to the fourth exemplary embodiment according to the present invention includes, as illustrated in FIG. 26, a response time measurement unit 2601, a routing unit 2602, and a communication route setting unit 2603. Hereinafter, these components may be simply referred to as "components of the communication processing system".

According to the present exemplary embodiment, each components of the communication processing system mentioned above may be communicatively connected to each other via a network. Note that such a network may be connected to any communication apparatus that includes the first communication apparatus 2604 and the second communication apparatus 2605. In addition, a plurality of first communication apparatuses 2604 and a plurality of second communication apparatuses 2605 may be connected.

In the present exemplary embodiment, each component of the communication processing system mentioned above may be configured by each information processing apparatus or the like, separately, or a plurality of components may be configured collectively by a single information processing apparatus or the like. The information processing apparatus or the like that can realize such components may be a physical entity such as a computer, or may be a virtual computer configured in a virtual environment.

The response time measurement unit 2601 measures the response time in the communication route between the first communication apparatus 2604 and the second communication apparatus 2605 communicably connected with the first communication apparatus 2604. That response time measurement unit 2601 may be configured similar to the RTT measuring unit (101a in FIG. 1, FIG. 8 and FIG. 21) in each of the above-described exemplary embodiments, or systemtap (2401a).

The routing unit 2602 includes a first communication route information storage 2602a that stores (keeps) the first communication route information to which a communication route between one or more communication apparatuses including the above-described first communication apparatus 2604 and the above-described second communication apparatus 2605. Such a routing unit 2602 may be configured similarly to the routing apparatus (103 in FIG. 1, 801 in FIG. 8, 2101 in FIG. 21) or the OpenFlow switch (2403 in FIG. 24) in each of the above-described exemplary embodiments, for example.

The communication route control unit 2602b in the routing unit 2602 controls the route, on which communication data is transmitted and received, between the above-mentioned communication apparatuses, based on the above-described first communication route information. Such a communication route control unit may be configured similarly to the communication route control unit (103a in FIG. 1, 801a in FIG. 8, 2101a in FIG. 21, 2403a in FIG. 24) in each of the above-described exemplary embodiments, for example. The first communication route information storage may be configured similarly to the first communication route information storage (103d in FIG. 1, 801e in FIG. 8, 2101d in FIG. 21, and the like) or the flow table storage (2403d in FIG. 24) in each of the above-described exemplary embodiments.

The communication route setting unit 2603 sets, as the first communication route information stored in the above-described first communication route information storage 2602a, the information setting one or more first communication routes between the above-described first communication apparatus 2604 and second communication apparatus 2605 based on the above-mentioned measured response time. Such a first communication route is a communication route on which communication data related to a certain communication between the above-described first communication apparatus 2604 and second communication apparatus 2605 is transmitted and received. Such a communication route setting unit 2603 may be configured similar to the communication route changing apparatus (102 in FIG. 1, FIG. 8 and FIG. 21) or the network monitoring apparatus (2402 in FIG. 24) in each of the above-described exemplary embodiments for example. In addition, the communication route setting unit 2603 sets, as the first communication route information stored in the above-described first communication route information storage 2602a, the information setting a communication route different from the above-described first communication route, on which communication data related to communication other than the certain communication described above is transmitted and received.

As described above, according to communication processing system in the present exemplary embodiment, it is possible to separate a communication route between certain communication apparatuses (e.g., between the first communication apparatus 2604 and the second communication apparatus 2605), from other communication routes between other communication apparatuses, based on the measured response time.

Consequently, according to the communication processing system in the present exemplary embodiment, it is possible to reduce the possibility of degradation of the real-time characteristics of communication on other communication routes attributed to a delay or the like caused on a certain communication route.

<Configuration of Hardware and Software Program (Computer Program)>

The following explains hardware and software programs that can realize each component of the communication processing system according to each of the above-described exemplary embodiments.

The first communication apparatus (101, 2604; hereinafter collectively referred to as "the first communication apparatus") constituting the communication processing system explained in each of the above-described exemplary embodiments may be configured by a hardware apparatus dedicated for realizing that function. The communication route changing apparatus (102, 2603; hereinafter collectively referred to as "communication route changing apparatus") may be configured by a hardware apparatus dedicated for realizing that function. The routing apparatus (103, 801, 2101, 2602; hereinafter collectively referred to as "routing apparatus") may be configured by a hardware apparatus dedicated for realizing that function. The second communication apparatus (104, 802, 2605; hereinafter collectively referred to as "second communication apparatus") may be configured by a hardware apparatus dedicated for realizing that function. In that case, the above-described components constituting the communication processing system may be realized as hardware integrating a part or a whole thereof (an integrated circuit or the like implementing the processing logic), or may be configured by separate pieces of hardware.

Figure 27:
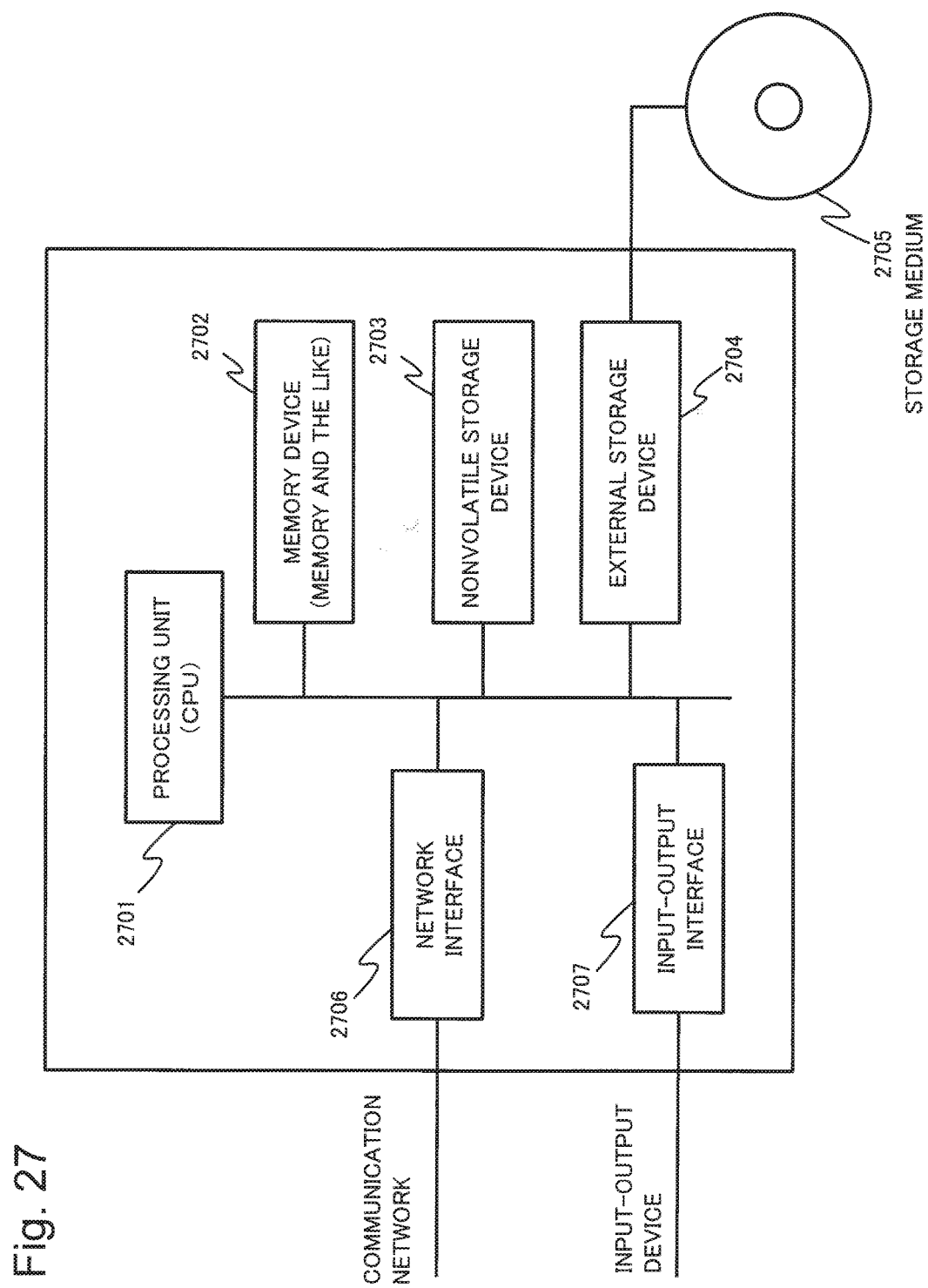
FIG. 27 is a block diagram illustrating a hardware configuration of an information processing apparatus that can realize the components of the communication processing system, according to each exemplary embodiment of the present invention.

In addition, the above-described components constituting the communication processing system may be configured by hardware apparatus illustrated in FIG. 27 and various type of software program (computer program) executed by such hardware apparatus. In that case, the above-described components constituting the communication processing system may be realized by a software program executed on single hardware apparatus. These components may also be realized by a software program executed on a plurality of hardware apparatus.

Note that the hardware apparatus illustrated in FIG. 27 in the following explanation may be simply referred to as "information processing hardware".

The processing unit 2701 in FIG. 27 is a processor such as general CPU (central processing unit) or a microprocessor. The processing unit 2701 may read, onto the memory device 2702, various types of software programs stored in the later-described nonvolatile storage device 2703 and execute processing according to the software program, for example.

The memory device 2702 is a memory device such as RAM (random access memory) that can be referenced by the processing unit 2701, and stores therein software programs, various types of data, and the like. Note that the memory device 2702 may be a volatile memory device.

The nonvolatile storage device 2703 may be a nonvolatile memory device such as a magnetic disk drive or a semiconductor memory device such as a flash memory, and store therein various types of software programs, data and the like.

The network interface 2706 is an interface device connecting to a network, and may adopt an interface device or the like for connecting to wire and wireless LAN (local area network). In each exemplary embodiment described above, the above-described components constituting the communication processing system may be connected to a network via the above-described network interface 2706. In each of the above-described exemplary embodiments, the network interface 2706 corresponds to the 407 illustrated in FIG. 4, for example.

The external storage device 2704 is an apparatus processing reading and writing of data to the later-described storage medium 2705, for example.

The storage medium 2705 may be any storage medium that can store data such as an optical disk, magneto-optical disk, a semiconductor flash memory, and the like.

The input-output interface 2707 is a device controlling input and output between an external input device (e.g., keyboard or mouse) and an external output device (e.g., display apparatus or printer).

The present invention explained by use of the above-described exemplary embodiments may be realized as follows, for example. That is, the information processing hardware illustrated in FIG. 27 is used to configure the above-described component constituting each of the communication processing systems described above. Then, to that information processing hardware, a software program that can realize the function of the flowchart referenced in the explanation of each of the above-described exemplary embodiments is supplied. Thereafter, that software program is executed by the processing unit 2701 in the information processing hardware.

In each of the above-described exemplary embodiments, each unit illustrated in each of the above-explained drawings can be realized as a software module being the unit of function (processing) of a software program executed by the above-described information processing hardware. However, the division of each software module illustrated in these drawings is for the explanation purposes, and various configurations are possible in implementation.

For example, in realizing each unit constituting the above-described information processing apparatus and the like as a software module, these software modules may be stored in the nonvolatile storage device 2703. Then, the processing unit 2701 may read these software modules onto the memory device 2702, in execution of respective processing.

In addition, it is possible to configure to transfer various types of data mutually between these software modules, by means of appropriate methods such as a shared memory, inter-process communication, and the like. Such a configuration enables a mutually communicable connection between these software modules.

Furthermore, it is also possible to record each of the above-described software programs on the storage medium 2705 in advance. In such a case, it is possible to configure so that the software programs can be stored in the nonvolatile storage device 2703 via the external storage device 2704 as necessary, in the shipping stage, the operation stage, and the like, of the above-described communication apparatus and the like.

In addition, such elements as the communication route information storage (103*d*, 801*e*, 2101*d*, 2602*a*), the second communication route information storage (104*d*, 802*k*), the network statistics information storage (2101*f*) and the like explained in each of the above-described exemplary embodiments may be realized using an appropriate data structure and the like and using the memory device 2702 and the nonvolatile storage device 2703. In addition, the information stored (kept) therein may be stored in the nonvolatile storage device 2703 by storing them in any database, and the like.

Note that the supply method of various types of software programs to each of the above-described information processing apparatuses and the like may be realized by the procedures that are currently widely known as exemplified below, for example. That is, the supply method of such software programs may be to install the software programs into the corresponding apparatus using an appropriate tool, in a production stage before shipping or in a maintenance stage after shipping, and the like. In addition, such a supply method of the software programs may be to download from outside the software programs via the communication line such as the Internet, or by any other procedures that are currently widely known. In that case, the present invention can be interpreted as being constituted by a code constituting that software program or a computer readable storage medium in which such a code is recorded.

So far, the present invention has been described by way of examples in which the present invention is applied to the above-described exemplary embodiments. However, the technical scope of the present invention is not limited to the scope described in each of the above exemplary embodiments. That is, the various modes of the present invention can be possible which can be appreciated by those skilled in the art within the scope of the present invention. It is clear to those skilled in the art that various changes or alterations can be made to the exemplary embodiments. A new exemplary embodiment to which such changes or alterations are made may also be included within the technical scope of the present invention, as is clear from the matters described in the claims below.

INDUSTRIAL APPLICABILITY

The present invention can realize a communication processing system and the like which can separate a communication route used for a certain communication from communication routes for other communications, in cases in which at least a part of the communication routes communicably connecting a plurality of communication apparatuses is undergoing a delay. Accordingly, the present invention can be applied to such a communication processing system for which it is important to reduce the occurrence of delay on a certain communication route and to maintain the real-time characteristics of communication. More specifically, the present invention can be applied to a communication processing system and the like, which can stably process the requests by mobile telephones, when the load is concentrated on the server configured to process the mobile telephones and the communication route connecting to the server. The present invention can also be applied to such purposes as a remote surgical operation system and an on-line meeting system, the important element of which is to assure the real-time characteristics of communication.

The present application claims the priority based on the Japanese Patent Application No. 2014-067518 filed on Mar. 28, 2014, and all the disclosure thereof is incorporated herein by reference.

REFERENCE SIGNS LIST

101 first communication apparatus
102 communication route changing apparatus
103 routing apparatus
104 second communication apparatus
402 communication apparatus A
403 communication apparatus B
404 communication apparatus C
405 network router
406 network cable
407 network interface
408 network port
801 routing apparatus
802 second communication apparatus
1101 network router
1102 communication apparatus A
1103 communication apparatus B
1104 communication apparatus C
2101 routing apparatus
2401 transmitting computer
2402 network monitoring apparatus
2403 OpenFlow switch
2404 receiving computer
2601 response time measurement unit
2602 routing unit
2603 communication route setting unit
2604 first communication apparatus
2605 second communication apparatus
2701 processing unit
2702 memory device
2703 nonvolatile storage device
2704 external storage device 2705 storage medium
2706 network interface
2707 input-output interface

The invention claimed is:

1. A communication processing system comprising:
hardware, including a processor and a non-transitory computer-readable data storage medium storing code that the processor executes;
a response time measuring unit implemented at least by the hardware in that the processor executes the code stored on the medium, and that is configured to measure a response time on a communication route between a first communication apparatus and a second communication apparatus communicably connected with the first communication apparatus;
a routing unit implemented at least by the hardware in that the processor executes the code stored on the medium, and that is configured to control a route on which communication data is transmitted and received between the one or more communication apparatuses, based on a first communication route information to which a communication route between one or more communication apparatuses including the first communication apparatus and the second communication apparatus is set; and
a communication route setting unit implemented at least by the hardware in that the processor executes the code stored on the medium, and that is configured to set, based on the measured response time, one or more first communication routes on which communication data related to a certain communication between the first communication apparatus and the second communication apparatus is transmitted and received, to the first communication route information, and
to set a communication route, being different from the first communication route, on which communication data related to a communication other than the certain communication is transmitted and received, to the first communication route information,
wherein the routing unit includes a first communication route information storage unit implemented at least by the hardware in that the processor executes the code stored on the medium, and and a communication route controlling unit implemented at least by the hardware in that the processor executes the code stored on the medium, and, the first communication route information storage storing the first communication route information, and the communication route controlling unit controlling the route on which communication data is transmitted and received between the one or more communication apparatuses, based on the first communication route information,
wherein when the second communication apparatus includes: a plurality of second data-transmission-reception-unit implemented at least in second hardware, and that transmit and receive communication data with another of the communication apparatuses; and a second communication route information storage that stores therein second communication route information including information for setting a communication route between each of the second data-transmission-reception-unit and another of the communication apparatuses,
wherein when the measured response time exceeds a reference value, the communication route setting unit sets the first communication route as a communication route associated with one or more of a plurality of the second data-transmission-reception-unit, to the second communication route information, and sets a communication route different from the first communication route as a communication route associated with another of the second data-transmission-reception-unit which is different from the one or more of a plurality of the second data-transmission-reception-unit,
wherein the routing unit includes a communication port communicably connected with the second data-transmission-reception-unit, and
wherein when a communication route different from the first communication route is set to a plurality of the communication ports and a plurality of the second data-transmission-reception-unit connected to a plurality of the communication ports,
wherein when the measured response time exceeds the reference value, the communication route setting unit sets the first communication route to the second communication route information, as a communication route associated with one or more of the second data-transmission-reception-unit to which a communication route different from the first communication route is set, and sets the first communication route to the first communication route information, as a communication route associated with the communication port connected to one or more of the second data-transmission-reception-unit to which a communication route different from the first communication route is set,
wherein the second communication apparatus includes a virtual network interface transmitting and receiving communication data on a virtual network,
wherein information related to the virtual network is set to the communication port in the routing unit, and
wherein when a communication route different from the first communication route in the virtual network is set to a plurality of the communication ports and the virtual network interface associated with a plurality of the second-data-transmission-reception-unit connected to the communication ports,
wherein when the measured response time exceeds the reference value, the communication route setting unit associates one or more of the virtual network interfaces to which a second communication route different from the first communication route in the virtual network is set, with another of the second data-transmission-reception-unit to which a third communication route different from the first communication routes is set, and adds a second communication route to the first communication route information, as a communication route associated with the second data-transmission-reception-unit to which the third communication route is set.

2. The communication processing system according to Claim 1, wherein
when the response time measured by the response time measuring unit exceeds the reference value,
the second communication apparatus creates the second data-transmission-reception-unit and
the communication route setting unit
sets the first communication route to the second communication route information, as a communication route associated with the created second data-transmission-reception-unit, and
sets the first communication route to the first communication route information, as a communication route associated with the communication port connected to the created second data-transmission-reception-unit.

3. The communication processing system according to Claim 1, wherein
when the response time measured by the response time measuring unit exceeds the reference value,
the second communication apparatus creates the second data-transmission-reception-unit, and
the communication route setting unit
sets a communication route different from the first communication route to the second communication route information, as a communication route associated with the created second data-transmission-reception-unit, and
sets a communication route different from the first communication route to the first communication route information, as a communication route associated with the communication port connected to the created second data-transmission-reception-unit.

4. The communication processing system according to Claim 1, wherein
the routing unit further includes a communication statistics information storage that stores statistics information measured with regard to communication data transmitted and received on the communication ports, for each of the communication ports, and
the communication route setting unit, based on the statistics information, when a load related to transmission and reception of communication data on a certain one of the communication ports is determined to be higher than a load related to transmission and reception of communication data on a different one of the communication ports, sets route information, with regard to one or more of the communication apparatuses, being set to the certain one of the communication ports, as route information to the different one of the communication ports.

5. The communication processing system according to Claim 1, wherein
when the response time measured by the response time measuring unit exceeds the reference value,
the second communication apparatus creates the second data-transmission-reception-unit, and
the communication route setting unit, so as to assign multiple communication routes between a plurality of the second data-transmission-reception-unit and a plurality of the communication ports, as the first communication route,
sets the first communication route to the second communication route information, as a communication route associated with the created second data-transmission-reception-unit, and
sets the first communication route to the first communication route information, as a communication route associated with the communication port connected to the created second data-transmission-reception-unit.

6. The communication processing system according to Claim 1 wherein
when the response time measured by the response time measuring unit exceeds the reference value,
the second communication apparatus creates the second data-transmission-reception-unit, and
the communication route setting unit, so as to assign multiple communication routes between a plurality of the second data-transmission-reception-unit and a plurality of the communication ports, as the first communication route,
sets a communication route different from the first communication route to the second communication route information, as a communication route associated with the created second data-transmission-reception-unit,
sets a communication route different from the first communication route to the first communication route information, as a communication route associated with the communication port connected to the created second data-transmission-reception-unit,
sets the first communication route to the second communication route information, as a communication route associated with one or more of the second data-transmission-reception-unit to which a communication route different from the first communication route is previously set,
and sets the first communication route to the first communication route information, as a communication route associated with the communication port connected to one or more of the second data-transmission-reception-unit to which a communication route different from the first communication route is previously set.

7. A communication processing apparatus comprising:
hardware, including a processor and a non-transitory computer-readable data storage medium storing code that the processor executes;
a routing unit implemented at least by the hardware in that the processor executes the code stored on the medium, and configured to include a first communication route information storage and a communication route controlling unit, the first communication route information storage storing first communication route information to which a communication route between one or more communication apparatuses including the first communication apparatus and a second communication apparatus communicably connected with the first communication apparatus is set, and the communication route controlling unit controlling a route on which communication data is transmitted and received between the one or more communication apparatuses based on the first communication route information; and
a communication route setting unit implemented at least by the hardware in that the processor executes the code stored on the medium, and that is configured,
based on a response time measured on a communication route between the first communication apparatus and the second communication apparatus, to set one or more first communication routes on which communication data related to a certain communication between the first communication apparatus and the second communication apparatus is transmitted and received, to the first communication route information, and
to set a communication route, being different from the first communication route, on which communication data related to a communication other than the certain communication is transmitted and received to the first communication route information,
wherein the routing unit includes a first communication route information storage unit implemented at least by the hardware in that the processor executes the code stored on the medium, and and a communication route controlling unit implemented at least by the hardware in that the processor executes the code stored on the medium, and, the first communication route information storage storing the first communication route information, and the communication route controlling unit controlling the route on which communication data is transmitted and received between the one or more communication apparatuses, based on the first communication route information, wherein when the second communication apparatus includes: a plurality of second data-transmission-reception-unit implemented at least in second hardware, and that transmit and receive communication data with another of the communication apparatuses; and a second communication route information storage that stores therein second communication route information including information for setting a communication route between each of the second data-transmission-reception-unit and another of the communication apparatuses, wherein when the measured response time exceeds a reference value, the communication route setting unit sets the first communication route as a communication route associated with one or more of a plurality of the second data-transmission-reception-unit, to the second communication route information, and sets a communication route different from the first communication route as a communication route associated with another of the second data-transmission-reception-unit which is different from the one or more of a plurality of the second data-transmission-reception-unit, wherein the routing unit includes a communication port communicably connected with the second data-transmission-reception-unit, and wherein when a communication route different from the first communication route is set to a plurality of the communication ports and a plurality of the second data-transmission-reception-unit connected to a plurality of the communication ports, wherein when the measured response time exceeds the reference value, the communication route setting unit sets the first communication route to the second communication route information, as a communication route associated with one or more of the second data-transmission-reception-unit to which a communication route different from the first communication route is set, and sets the first communication route to the first communication route information, as a communication route associated with the communication port connected to one or more of the second data-transmission-reception-unit to which a communication route different from the first communication route is set, wherein the second communication apparatus includes a virtual network interface transmitting and receiving communication data on a virtual network, wherein information related to the virtual network is set to the communication port in the routing unit, and wherein when a communication route different from the first communication route in the virtual network is set to a plurality of the communication ports and the virtual network interface associated with a plurality of the second-data-transmission-reception-unit connected to the communication ports, wherein when the measured response time exceeds the reference value, the communication route setting unit associates one or more of the virtual network interfaces to which a second communication route different from the first communication route in the virtual network is set, with another of the second data-transmission-reception-unit to which a third communication route different from the first communication routes is set, and adds a second communication route to the first communication route information, as a communication route associated with the second data-transmission-reception-unit to which the third communication route is set.

8. A communication processing method, comprising:

measuring, by a processor of a computing device, a response time on a communication route between a first communication apparatus and a second communication apparatus connected to be communicable with the first communication apparatus; and based on the measured response time, setting, by the processor, one or more first communication routes on which communication data related to a certain communication between the first communication apparatus and the second communication apparatus is transmitted and received, and setting a communication route different from the first communication route on which communication data related to a communication other than the certain communication is transmitted and received, wherein a routing unit, implemented by hardware of the computing device including the processor and a non-transitory computer-readable storage medium storign code that the processor executes, includes a first communication route information storage unit implemented at least by the hardware in that the processor executes the code stored on the medium, and and a communication route controlling unit implemented at least by the hardware in that the processor executes the code stored on the medium, and, the first communication route information storage storing the first communication route information, and the communication route controlling unit controlling the route on which communication data is transmitted and received between the one or more communication apparatuses, based on the first communication route information, wherein when the second communication apparatus includes: a plurality of second data-transmission-reception-unit implemented at least in second hardware, and that transmit and receive communication data with another of the communication apparatuses; and a second communication route information storage that stores therein second communication route information including information for setting a communication route between each of the second data-transmission-reception-unit and another of the communication apparatuses, wherein when the measured response time exceeds a reference value, a communication route setting unit implemented at least by the hardware of the computing device sets the first communication route as a communication route associated with one or more of a plurality of the second data-transmission-reception-unit, to the second communication route information, and sets a communication route different from the first communication route as a communication route associated with another of the second data-transmission-reception-unit which is different from the one or more of a plurality of the second data-transmission-reception-unit, wherein the routing unit includes a communication port communicably connected with the second data-transmission-reception-unit, and wherein when a communication route different from the first communication route is set to a plurality of the communication ports and a plurality of the second data-transmission-reception-unit connected to a plurality of the communication ports, wherein when the measured response time exceeds the reference value, the communication route setting unit sets the first communication route to the second communication route information, as a communication route associated with one or more of the second data-transmission-reception-unit to which a communication route different from the first communication route is set, and sets the first communication route to the first communication route information, as a communication route associated with the communication port connected to one or more of the second data-transmission-reception-unit to which a communication route different from the first communication route is set, wherein the second communication apparatus includes a virtual network interface transmitting and receiving communication data on a virtual network, wherein information related to the virtual network is set to the communication port in the routing unit, and wherein when a communication route different from the first communication route in the virtual network is set to a plurality of the communication ports and the virtual network interface associated with a plurality of the second-data-transmission-reception-unit connected to the communication ports, wherein when the measured response time exceeds the reference value, the communication route setting unit associates one or more of the virtual network interfaces to which a second communication route different from the first communication route in the virtual network is set, with another of the second data-transmission-reception-unit to which a third communication route different from the first communication routes is set, and adds a second communication route to the first communication route information, as a communication route associated with the second data-transmission-reception-unit to which the third communication route is set.

* * * * *